(12) United States Patent
Siomina et al.

(10) Patent No.: US 10,511,986 B2
(45) Date of Patent: Dec. 17, 2019

(54) COMBINED MEASUREMENT REPORT MAPPING

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/770,000

(22) PCT Filed: Nov. 7, 2016

(86) PCT No.: PCT/SE2016/051095
§ 371 (c)(1),
(2) Date: Apr. 20, 2018

(87) PCT Pub. No.: WO2017/078610
PCT Pub. Date: May 11, 2017

(65) Prior Publication Data
US 2019/0141554 A1    May 9, 2019

Related U.S. Application Data

(60) Provisional application No. 62/251,814, filed on Nov. 6, 2015.

(51) Int. Cl.
*H04W 24/10* (2009.01)
*G01S 5/02* (2010.01)
(Continued)

(52) U.S. Cl.
CPC ........... *H04W 24/10* (2013.01); *G01S 5/0221* (2013.01); *H04B 17/309* (2015.01); *H04L 5/0048* (2013.01); *H04W 64/003* (2013.01)

(58) Field of Classification Search
CPC .. H04W 24/10; H04W 64/003; H04L 5/0048; H04B 17/309; G01S 5/0221
See application file for complete search history.

(56) References Cited

U.S. PATENT DOCUMENTS

2011/0039574 A1* 2/2011 Charbit ................. G01S 5/0215
                                                455/456.1
2011/0143770 A1* 6/2011 Charbit ................. G01S 5/0036
                                                455/456.1
(Continued)

FOREIGN PATENT DOCUMENTS

GB        2499671 A        8/2013
KR    2010 0041602 A       4/2010
(Continued)

OTHER PUBLICATIONS

3GPP TSG RAN WG1 Meeting #82bis; Malmo, Sweden; Source: Ericsson; Title: Prioritized OTDOA Enhancements for Indoor Positioning (R1-156066)—Oct. 5-9, 2015.
(Continued)

*Primary Examiner* — Afshawn M Towfighi
(74) *Attorney, Agent, or Firm* — Baker Botts, LLP

(57) ABSTRACT

A first, second and third node as well as methods performed thereby are provided for providing a measurement result to the second node by the wireless device. The method performed by the wireless device comprises obtaining an adaptive resolution factor; and providing a combined measurement report based on the obtained adaptive resolution factor and a measurement result, wherein a combined measurement report comprises at least two reported levels, which jointly represents the measurement result, to the second node.

9 Claims, 17 Drawing Sheets

(51) Int. Cl.
  *H04B 17/309* (2015.01)
  *H04L 5/00* (2006.01)
  *H04W 64/00* (2009.01)

(56) References Cited

U.S. PATENT DOCUMENTS

| | | | | |
|---|---|---|---|---|
| 2012/0315890 A1* | 12/2012 | Suzuki | H04W 24/10 | 455/422.1 |
| 2014/0057664 A1* | 2/2014 | Pei | H04W 64/006 | 455/456.5 |
| 2014/0126403 A1* | 5/2014 | Siomina | H04W 24/10 | 370/252 |
| 2015/0050934 A1* | 2/2015 | Jung | H04W 36/0083 | 455/437 |

FOREIGN PATENT DOCUMENTS

| WO | 2008 018039 A2 | 2/2008 |
|---|---|---|
| WO | 2012 113435 A1 | 8/2012 |
| WO | 2016 190806 A1 | 12/2016 |

OTHER PUBLICATIONS

3GPP TSG RAN WG4 #76bis; WF on Reducing Quantization Error; Sophia Antipolis, France (R4-156684)—Oct. 12-16, 2015.

3GPP TSG-RAN WG4 Meeting #77; Anaheim, CA, USA; Title: RSTD measurement report mapping with higher resolution; Source to WG: Ericsson; Source to TSG: RAN WG4 (R4-158057)—Nov. 16-20, 2015.

3GPP TSG RAN WG4 Meeting #80; Gothenburg, Sweden; Source: Ericsson; Title: On RSTD measurement report mapping enhancement (R4-165278)—Aug. 22-26, 2016.

PCT International Search Report for International application No. PCT/SE2016/051095—dated Feb. 1, 2017.

PCT Written Opinion of the International Searching Authority for International application No. PCT/SE2016/051095—dated Feb. 1, 2017.

Supplementary European Search Report for Application No. EP 16 86 2564—dated Mar. 21, 2019.

* cited by examiner

Reporting via RRC [3GPP TS 36.331, 12.7.0 (2015-09-25)]:

```
MeasResultForECID-r9 ::=          SEQUENCE {
    ue-RxTxTimeDiffResult-r9              INTEGER (0..4095),
    currentSFN-r9                         BIT STRING (SIZE (10))
}
```

> *ue-RxTxTimeDiffResult*
> UE Rx-Tx time difference measurement result of the PCell, provided by lower layers. According to UE Rx-Tx time difference report mapping in TS 36.133 [10].

Fig. 1a

Reporting via LPP [3GPP TS 36.355 V12.4.0 (2015-03)]:

```
MeasuredResultsList ::= SEQUENCE (SIZE(1..32)) OF MeasuredResultsElement

MeasuredResultsElement ::= SEQUENCE {
    physCellId      INTEGER (0..503),
    cellGlobalId    CellGlobalIdEUTRA-AndUTRA     OPTIONAL,
    arfcnEUTRA      ARFCN-ValueEUTRA,
    systemFrameNumber
                    BIT STRING (SIZE (10))        OPTIONAL,
    rsrp-Result     INTEGER (0..97)               OPTIONAL,
    rsrq-Result     INTEGER (0..34)               OPTIONAL,
    ue-RxTxTimeDiff INTEGER (0..4095)             OPTIONAL,
    [[ arfcnEUTRA-v9a0    ARFCN-ValueEUTRA-v9a0   OPTIONAL    -- Cond EARFCN-max
    ]]
}
```

Fig. 1b

9.2.5 E-CID Measurement Result

The purpose of the E-CID Measurement Result information element is to provide the E-CID measurement result.

| IE/Group Name | Presence | Range | IE Type and Reference | Semantics Description |
|---|---|---|---|---|
| Serving Cell ID | M | | ECGI 9.2.6 | E-UTRAN Cell Identifier of the serving cell |
| Serving Cell TAC | M | | OCTET STRING(2) | Tracking Area Code of the serving cell |
| E-UTRAN Access Point Position | O | | 9.2.8 | The configured estimated geographical position of the antenna of the cell. |
| Measured Results | | 0 .. <maxnoMeas> | | |
| >CHOICE Measured Results Value | M | | | |
| >>Value Angle of Arrival | M | | INTEGER (0..719) | According to mapping in TS 36.133 [8] |
| >>Value Timing Advance Type 1 | M | | INTEGER (0..7690) | According to mapping in TS 36.133 [8] |
| >>Value Timing Advance Type 2 | M | | INTEGER (0..7690) | According to mapping in TS 36.133 [8] |
| >>Result RSRP | | 1 .. <maxCellReport> | | |
| >>>PCI | M | | INTEGER (0..503, ...) | Physical Cell Identifier of the reported cell |
| >>>EARFCN | M | | INTEGER (0..65535, | Corresponds to NDL for |

Fig. 1c

Table 1: UE Rx-Tx time difference measurement report mapping (3GPP TS 36.133, Table 9.1.9.2-1)

| Reported value | Measured quantity value | Unit |
|---|---|---|
| RX-TX_TIME_DIFFERENCE_0000 | $T_{UE\,Rx\text{-}Tx} < 2$ | $T_s$ |
| RX-TX_TIME_DIFFERENCE_0001 | $2 \leq T_{UE\,Rx\text{-}Tx} < 4$ | $T_s$ |
| RX-TX_TIME_DIFFERENCE_0002 | $4 \leq T_{UE\,Rx\text{-}Tx} < 6$ | $T_s$ |
| ... | ... | ... |
| RX-TX_TIME_DIFFERENCE_2046 | $4092 \leq T_{UE\,Rx\text{-}Tx} < 4094$ | $T_s$ |
| RX-TX_TIME_DIFFERENCE_2047 | $4094 \leq T_{UE\,Rx\text{-}Tx} < 4096$ | $T_s$ |
| RX-TX_TIME_DIFFERENCE_2048 | $4096 \leq T_{UE\,Rx\text{-}Tx} < 4104$ | $T_s$ |
| RX-TX_TIME_DIFFERENCE_2049 | $4104 \leq T_{UE\,Rx\text{-}Tx} < 4112$ | $T_s$ |
| ... | ... | ... |
| RX-TX_TIME_DIFFERENCE_4093 | $20456 \leq T_{UE\,Rx\text{-}Tx} < 20464$ | $T_s$ |
| RX-TX_TIME_DIFFERENCE_4094 | $20464 \leq T_{UE\,Rx\text{-}Tx} < 20472$ | $T_s$ |
| RX-TX_TIME_DIFFERENCE_4095 | $20472 \leq T_{UE\,Rx\text{-}Tx}$ | $T_s$ |

Fig. 1d

Reporting via LPP [3GPP TS 36.355 V12.4.0 (2015-03)]:

```
NeighbourMeasurementElement ::= SEQUENCE {
    physCellIdNeighbour     INTEGER (0..503),
    cellGlobalIdNeighbour   ECGI                    OPTIONAL,
    earfcnNeighbour         ARFCN-ValueEUTRA        OPTIONAL,    -- Cond NotSameAsRef2
    rstd                    INTEGER (0..12711),
    rstd-Quality            OTDOA-MeasQuality,
    ...,
    [[ earfcnNeighbour-v9a0 ARFCN-ValueEUTRA-v9a0   OPTIONAL     -- Cond NotSameAsRef3
    ]]
}
```

*rstd*
This field specifies the relative timing difference between this neighbour cell and the RSTD reference cell, as defined in [17]. Mapping of the measured quantity is defined as in [18] subclause 9.1.10.3.

Fig. 2a

Table 2: RSTD report mapping (3GPP TS 36.133, Table 9.1.10.3-1)

| Reported Value | Measured Quantity Value | Unit |
|---|---|---|
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

Fig. 2b

Table 3: Higher-resolution RSTD measurement report mapping

| Reported Reference Quantity Value | Measured RSTD Value | Unit |
|---|---|---|
| RSTD_0000 | $-15391 > \text{RSTD}$ | $T_s$ |
| RSTD_0001 | $-15391 + \Delta_{RSTD} \leq \text{RSTD} \leq -15391 + (\Delta_{RSTD}+r) < -15386$ | $T_s$ |
| ... | ... | ... |
| RSTD_2258 | $-4106 + \Delta_{RSTD} \leq \text{RSTD} \leq -4106 + (\Delta_{RSTD}+r) < -4101$ | $T_s$ |
| RSTD_2259 | $-4101 + \Delta_{RSTD} \leq \text{RSTD} \leq -4101 + (\Delta_{RSTD}+r) < -4096$ | $T_s$ |
| RSTD_2260 | $-4096 + \Delta_{RSTD} \leq \text{RSTD} \leq -4096 + (\Delta_{RSTD}+r) < -4095$ | $T_s$ |
| RSTD_2261 | $-4095 + \Delta_{RSTD} \leq \text{RSTD} \leq -4095 + (\Delta_{RSTD}+r) < -4094$ | $T_s$ |
| ... | ... | ... |
| RSTD_6353 | $-3 + \Delta_{RSTD} \leq \text{RSTD} \leq -3 + (\Delta_{RSTD}+r) < -2$ | $T_s$ |
| RSTD_6354 | $-2 + \Delta_{RSTD} \leq \text{RSTD} \leq -2 + (\Delta_{RSTD}+r) < -1$ | $T_s$ |
| RSTD_6355 | $-1 + \Delta_{RSTD} \leq \text{RSTD} \leq -1 + (\Delta_{RSTD}+r) \leq 0$ | $T_s$ |
| RSTD_6356 | $0 + \Delta_{RSTD} < \text{RSTD} \leq 0 + (\Delta_{RSTD}+r) \leq 1$ | $T_s$ |
| RSTD_6357 | $1 + \Delta_{RSTD} < \text{RSTD} \leq 1 + (\Delta_{RSTD}+r) \leq 2$ | $T_s$ |
| RSTD_6358 | $2 + \Delta_{RSTD} < \text{RSTD} \leq 2 + (\Delta_{RSTD}+r) \leq 3$ | $T_s$ |
| ... | ... | ... |
| RSTD_10450 | $4094 + \Delta_{RSTD} < \text{RSTD} \leq 4094 + (\Delta_{RSTD}+r) \leq 4095$ | $T_s$ |
| RSTD_10451 | $4095 + \Delta_{RSTD} < \text{RSTD} \leq 4095 + (\Delta_{RSTD}+r) \leq 4096$ | $T_s$ |
| RSTD_10452 | $4096 + \Delta_{RSTD} < \text{RSTD} \leq 4096 + (\Delta_{RSTD}+r) \leq 4101$ | $T_s$ |
| RSTD_10453 | $4101 + \Delta_{RSTD} < \text{RSTD} \leq 4101 + (\Delta_{RSTD}+r) \leq 4106$ | $T_s$ |
| ... | ... | ... |
| RSTD_12709 | $15381 + \Delta_{RSTD} < \text{RSTD} \leq 15381 + (\Delta_{RSTD}+r) \leq 15386$ | $T_s$ |
| RSTD_12710 | $15386 + \Delta_{RSTD} < \text{RSTD} \leq 15381 + (\Delta_{RSTD}+r) \leq 15391$ | $T_s$ |
| RSTD_12711 | $15391 < \text{RSTD}$ | $T_s$ |

Fig. 5a

Table 4: Relative quantity mapping for higher-resolution RSTD measurement reporting

| Reported Relative Quantity Value | Measured Relative Quantity Value, $\Delta_{RSTD}$ | Unit |
|---|---|---|
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 1.5 | $T_s$ |
| RSTD_delta_4 | 2.0 | $T_s$ |
| RSTD_delta_5 | 2.5 | $T_s$ |
| RSTD_delta_6 | 3.0 | $T_s$ |
| RSTD_delta_7 | 3.5 | $T_s$ |
| RSTD_delta_8 | 4.0 | $T_s$ |
| RSTD_delta_9 | 4.5 | $T_s$ |

Fig. 5b

Table 5: Higher-resolution RSTD measurement report mapping

| Reported Reference Quantity Value | Measured RSTD Value | Unit |
|---|---|---|
| RSTD_0000 | $-15391 > \text{RSTD}$ | $T_s$ |
| RSTD_0001 | $-15391 + \Delta_{RSTD} \leq \text{RSTD} \leq -15391 + (\Delta_{RSTD}+0.5) < -15386$ | $T_s$ |
| ... | ... | ... |
| RSTD_2258 | $-4106 + \Delta_{RSTD} \leq \text{RSTD} \leq -4106 + (\Delta_{RSTD}+0.5) < -4101$ | $T_s$ |
| RSTD_2259 | $-4101 + \Delta_{RSTD} \leq \text{RSTD} \leq -4101 + (\Delta_{RSTD}+0.5) < -4096$ | $T_s$ |
| RSTD_2260 | $-4096 + \Delta_{RSTD} \leq \text{RSTD} \leq -4096 + (\Delta_{RSTD}+0.5) < -4095$ | $T_s$ |
| RSTD_2261 | $-4095 + \Delta_{RSTD} \leq \text{RSTD} \leq -4095 + (\Delta_{RSTD}+0.5) < -4094$ | $T_s$ |
| ... | ... | ... |
| RSTD_6353 | $-3 + \Delta_{RSTD} \leq \text{RSTD} \leq -3 + (\Delta_{RSTD}+0.5) < -2$ | $T_s$ |
| RSTD_6354 | $-2 + \Delta_{RSTD} \leq \text{RSTD} \leq -2 + (\Delta_{RSTD}+0.5) < -1$ | $T_s$ |
| RSTD_6355 | $-1 + \Delta_{RSTD} \leq \text{RSTD} \leq -1 + (\Delta_{RSTD}+0.5) \leq 0$ | $T_s$ |
| RSTD_6356 | $0 + \Delta_{RSTD} < \text{RSTD} \leq 0 + (\Delta_{RSTD}+0.5) \leq 1$ | $T_s$ |
| RSTD_6357 | $1 + \Delta_{RSTD} < \text{RSTD} \leq 1 + (\Delta_{RSTD}+0.5) \leq 2$ | $T_s$ |
| RSTD_6358 | $2 + \Delta_{RSTD} < \text{RSTD} \leq 2 + (\Delta_{RSTD}+0.5) \leq 3$ | $T_s$ |
| ... | ... | ... |
| RSTD_10450 | $4094 + \Delta_{RSTD} < \text{RSTD} \leq 4094 + (\Delta_{RSTD}+0.5) \leq 4095$ | $T_s$ |
| RSTD_10451 | $4095 + \Delta_{RSTD} < \text{RSTD} \leq 4095 + (\Delta_{RSTD}+0.5) \leq 4096$ | $T_s$ |
| RSTD_10452 | $4096 + \Delta_{RSTD} < \text{RSTD} \leq 4096 + (\Delta_{RSTD}+0.5) \leq 4101$ | $T_s$ |
| RSTD_10453 | $4101 + \Delta_{RSTD} < \text{RSTD} \leq 4101 + (\Delta_{RSTD}+0.5) \leq 4106$ | $T_s$ |
| ... | ... | ... |
| RSTD_12709 | $15381 + \Delta_{RSTD} < \text{RSTD} \leq 15381 + (\Delta_{RSTD}+0.5) \leq 15386$ | $T_s$ |
| RSTD_12710 | $15386 + \Delta_{RSTD} < \text{RSTD} \leq 15381 + (\Delta_{RSTD}+0.5) \leq 15391$ | $T_s$ |
| RSTD_12711 | $15391 < \text{RSTD}$ | $T_s$ |

Fig. 5c

Table 6: OTDOA horizontal positioning error with different RSTD quantisation error

|         | 50%   | 60%   | 70%   | 80%   | 90%   | 100%   |
|---------|-------|-------|-------|-------|-------|--------|
| 1 Ts    | 2.4 m | 2.8 m | 3.3 m | 4.0 m | 5.7 m | 13.6 m |
| 0.5 Ts  | 1.6 m | 1.8 m | 2.2 m | 2.6 m | 3.4 m | 13.4 m |
| 0.25 Ts | 1.4 m | 1.6 m | 1.8 m | 2.2 m | 2.7 m | 5.1 m  |

COMBINED MEASUREMENT REPORT MAPPING

PRIORITY

This nonprovisional application is a U.S. National Stage Filing under 35 U.S.C. § 371 of International Patent Application Serial No. PCT/SE2016/051095 tiled Nov. 7, 2016, and entitled "COMBINED MEASUREMENT REPORT MAPPING" which claims priority to U.S. Provisional Patent Application No, 62/251,814 filed Nov. 6, 2015, both of which are hereby incorporated by reference in their entirety.

TECHNICAL FIELD

The present disclosure relates to measurement reporting and in particular to combined measurement reporting with adaptive resolution.

BACKGROUND

Radio measurements are performed by radio nodes (e.g. wireless devices, network nodes etc.) on received radio signals. The radio measurements may be done for various purposes e.g. Radio Resource Management RRM, mobility, positioning, Self Optimising Network, SON, Minimisation of Drive Tests, MDT, etc. Depending on the technology of the wireless communication in which the radio nodes are operable, the type of measurements and how they are measured are generally standardised, e.g. by $3^{rd}$ Generation Partnership Project, 3GPP. Examples of different technologies and/or type of communication networks are Long term Evolution, LTE, which is based on Orthogonal Frequency Division Multiplexing, OFDM; Global System for Mobile communication, GSM, which is based on Time Division Multiple Access, TDMA; Universal Mobile Telecommunications System, UMTS, which is based on Code Division Multiple Access, CDMA, High Speed Packet Access, HSPA, etc. These examples are non-limiting and are only mentioned as just examples.

Many measurements exist already in 3GPP; however, with new deployment types, new features and wireless technology advances there is a need to update and/or improve the measurement reporting.

SUMMARY

The object is to obviate at least some of the problems outlined above. In particular, it is an object to provide a method performed by a wireless device for providing a measurement to a second node. These objects and others may be obtained by providing a first and second node and a method performed by a first and second node according to the independent claims attached below.

According to an aspect, a method performed by a wireless device in a wireless communication network for providing a measurement result to a second node is provided. The method comprises obtaining an adaptive resolution factor; and providing a combined measurement report based on the obtained adaptive resolution factor and a measurement result, wherein a combined measurement report comprises at least two reported levels, which jointly represents the measurement result, to the second node.

According to an aspect, a method performed by a second node in a wireless communication network for obtaining a measurement result from a wireless device is provided. The method comprises receiving a combined measurement from the wireless device, wherein the combined measurement report comprises at least two reported levels, which jointly represents a measurement result and is based on an adaptive resolution factor; and using the received combined measurement report to perform one or more operational tasks.

According to an aspect, a method performed by a third node in a wireless communication network for obtaining a measurement result from a wireless device is provided. The method comprises determining whether the wireless device is to transmit at least one measurement result to a second node using a combined measurement report mapping or using a single measurement report mapping, wherein the combined measurement report mapping comprises at least two reported levels, which jointly represents the at least one measurement result. The method also comprises, when the combined measurement report mapping is to be used, determining an adaptive resolution factor to be used in the combined measurement report mapping; and providing the wireless device with the information that it is to transmit the at least one measurement result to a second node using the combined measurement report mapping with the adaptive resolution factor.

According to an aspect, wireless device in a wireless communication network for providing a measurement result to a second node is provided. The wireless device is configured for obtaining an adaptive resolution factor; and providing a combined measurement report based on the obtained adaptive resolution factor and a measurement result, wherein a combined measurement report comprises at least two reported levels, which jointly represents the measurement result, to the second node.

According to an aspect, second node in a wireless communication network for obtaining a measurement result from a wireless device is provided. The second node is configured for receiving a combined measurement from the wireless device, wherein the combined measurement report comprises at least two reported levels, which jointly represents a measurement result and is based on an adaptive resolution factor; and using the received combined measurement report to perform one or more operational tasks.

According to an aspect, a third node in a wireless communication network for obtaining a measurement result from a wireless device is provided. The third node is configured for determining whether the wireless device is to transmit at least one measurement result to a second node using a combined measurement report mapping or using a single measurement report mapping, wherein the combined measurement report mapping comprises at least two reported levels, which jointly represents the at least one measurement result. The third node is further configured for, when the combined measurement report mapping is to be used, determining an adaptive resolution factor to be used in the combined measurement report mapping; and providing the wireless device with the information that it is to transmit the at least one measurement result to a second node using the combined measurement report mapping with the adaptive resolution factor.

The wireless device, the second node, the third node and the respective method performed thereby have several advantages. One possible advantage is that the methods and nodes enable a wireless device (e.g. a UE) and network nodes to use combined measurement report mapping with adaptive resolution. Another possible advantage is that the methods enable reducing signalling overhead on the average. Still a further possible advantage is that the methods and node enable simplifying the standardising of enhanced measurement report mapping, e.g. to extend the mapping beyond the existing range or to enable finer granularity measurement reporting. The methods and nodes further enable adaptive resolution of the reported measurement results, i.e. by the virtue of combined report mapping the same measurement results may be reported with better granularity or resolution if the results are required for task requiring more precision, e.g. positioning for emergency services etc. Otherwise the results may be reported with single report mapping with fewer signalling overheads.

BRIEF DESCRIPTION OF DRAWINGS

Embodiments will now be described in more detail in relation to the accompanying drawings, in which:

FIG. 1a illustrates reporting via RRC [3GPP TS 36.331, 12.7.0 (2015-09-25)].

FIG. 1b illustrates reporting via RRC [3GPP TS 36.355; V12.4.0 (2015-03)].

FIG. 1c illustrates E-CID Measurement Result.

FIG. 1d illustrates table 1 showing the UE Rx-Tx time difference measurement report mapping (3GPP TS 36.133 Table 9.19.2-1).

FIG. 2a illustrates reporting via LPP [3GPP TS 36.355, V12.4.0 (2015-03)].

FIG. 2b illustrates table 2 showing RSTD report mapping (3GPP TS 36.133 Table 9.1.10.3-1).

FIG. 5a illustrates table 3 showing higher-resolution RSTD measurement report mapping.

FIG. 5b illustrates table 4 showing relative quantity mapping for higher-resolution RSTD measurement reporting.

FIG. 5c illustrates table 5 showing higher-resolution RSTD measurement report mapping.

FIG. 14 is an illustration of table 6 showing OTDOA horizontal positioning error with different RSTD quantisation error.

DETAILED DESCRIPTION

Radio Signal Measurements

Figure 3:
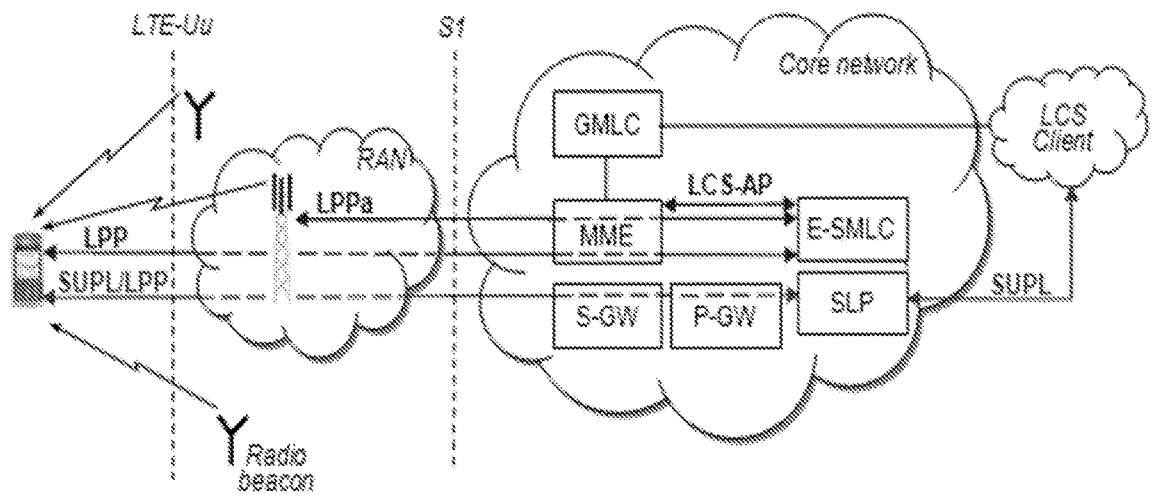
FIG. 3 illustrates an example positioning architecture in LTE.

Radio measurements may be performed by radio nodes (e.g. wireless devices such as User Equipments, UEs; radio base stations such as eNodeBs, eNBs; or localisation entities/nodes such as Location Measurement/Management Units, LMU) on received radio signals. In LTE the measurements may be done for various purposes e.g. RRM, mobility positioning, SON, MDT, etc. The same measurement may be performed for one or more purposes. In addition, measurements may be pattern-based measurements, e.g. performed according to a certain time and/or frequency pattern (e.g. measurement gap pattern, time-domain measurement resource restriction pattern for downlink, DL, and/or uplink, UL, measurements, measurement cycle pattern for measurements on Serving Cells, SCells, with Carrier Aggregation, CA, etc.). The measurement may also be performed over a certain bandwidth (e.g. wideband Reference Signal Received Quality, RSRQ, measurements or measurements performed over a configured measurement bandwidth which may be smaller than the system bandwidth). The measurements may be with or without CA (see the section on multi-carrier networks for details on CA).

For LTE, most of the physical-layer measurements are specified in 3GPP TS 36.214. There may also be Layer 2 measurements, e.g. specified in 3GPP TS 36.314.

UE measurements (i.e. measurements performed by a wireless device) may be classified as intra-/inter-frequency, intra-/inter-RAT (Radio Access Technology), intra-/inter-band. It is generally mandatory for all UEs (wireless devices) to support all intra-RAT measurements (i.e. inter-frequency and intra-band measurements) and meet the associated requirements. However the inter-band and inter-RAT measurements are UE capabilities, which may be reported to the network during the call setup.

For a network node such as an eNodeB (eNB), it is generally assumed that the eNodeB is able to perform measurements for multiple UEs over all declared frequencies, RATs, and frequency bands, which is, however, costly for the eNodeBs (since the eNodeB implementation needs then to cover a wide range of scenarios) and requires high complexity to implement all measurement combinations over declared configurations.

RRM and Mobility Measurements

The well known intra-LTE mobility measurements (intra-, inter-frequency, CA) are:

Reference Signal Received Power, RSRP.

RSRQ.

Reference Signal—Signal to Noise and Interference Ratio, RS-SINR.

The well known inter-RAT mobility measurements are:

Universal Terrestrial Radio Access Network (UTRAN) Common Pilot Channel (CPICH) Received Signal Code Power (RSCP).

UTRAN CPICH Ec/No (RSCP/RSSI—Received Signal Strength Indicator—total receive power)

GSM carrier RSSI.

CDMA2000 Pilot Strength.

High Rate Packet Data (HRPD) Pilot Strength.

Timing Measurements

Some examples of timing measurements are Round Trip Time (RTT), Time of Arrival (TOA), UpLink Relative Time of Arrival (UL RTOA), Time Difference of Arrival (TDOA), Reference Signal Time Difference (RSTD), User Equipment Receiver-Transmitter (UE Rx-Tx), eNodeB Rx-Tx, SFN-SFN timing (SFN—Single Frequency Network), one-way propagation delay, timing advance measurement.

Positioning Measurements

The following positioning measurements may be possible with enhanced cell ID and Observed Time Difference Of Arrival (OTDOA) positioning methods since 3GPP release 9.

UE Rx-Tx time difference measurement eNodeB Rx-Tx time difference measurement

Timing advance (TA) measurement

Angle of Arrival (AoA)

RSTD for OTDOA

RSRP and RSRQ

In relation to indoor positioning work in LTE, also some new measurements are currently being discussed, e.g.

WiFi and Bluetooth RSSI measurements

Barometric pressure measurements

Measurements based on emulated signals transmitted by beacons (e.g. terrestrial beacon system transmitters)

Minimization of Drive Tests

The minimization of drive test (MDT) feature has been introduced in LTE and HSPA 3GPP release 10. The MDT feature provides means for reducing the effort for operators when gathering information for the purpose of network planning and optimisation. The MDT feature requires that the UEs log or obtain various types of measurements, events and coverage related information. The logged or collected measurements or relevant information are then sent to the network. This is in contrast to the traditional approach where the operator has to collect similar information by means of the so called drive tests and manual logging. The MDT is described in TS 37.320.

The UE may collect the measurements during connected as well as in low activity states e.g. idle state in UMTS Terrestrial Radio Access/evolved UMTS Terrestrial Radio Access (UTRA/E-UTRA), cell Paging Channel (PCH) states in UTRA etc.

The measurement report may consist of measurement results for the serving cell and neighbour cells, intra-frequency/inter-frequency/inter-RAT, time stamp and location information or radio fingerprinting measurements. The measurements may be collected in idle state (logged MDT) or CONNECTED state (immediate MDT). For immediate MDT, also eNodeB measurements may be included in MDT reports.

The measurement reports for MDT may comprise:

Mobility measurements e g RSRP and RSRQ for E-UTRA, RSCP and Ec/No for UTRA, Pilot Strength for CDMA2000, etc.

Radio link failure report

Number of Random Access Preambles transmitted. Indication whether the maximum transmission power was used, number of Msg3's (of the random access procedure) sent, contention detected.

Power headroom measurement by the UE [TS 36.213]

Received interference power measurement by eNodeB [TS 36.214]

Data volume measurement separately for DL and UL by eNodeB

Scheduled IP throughput separately for DL and UL by eNodeB [TS 36.314]

Self Organising/Optimising Network

The E-UTRAN employs the concept of self-organising network (SON), sometimes also referred to as self optimising network. The objective of the SON entity is to allow operators to automatically plan and tune the network parameters and configure the network nodes.

The conventional method is based on manual tuning, which consumes enormous amount of time, resources and requires considerable involvement of work force. In particular due to the network complexity, large number of system parameters, Inter-RAT technologies etc. it is very attractive to have reliable schemes and mechanism which could automatically configure the network whenever necessary. This can be realised by SON, which can be visualised as a set of algorithms and protocols performing the task of automatic network tuning, planning, configuration, parameter settings etc. In order to accomplish this, the SON node requires measurement reports and results from other nodes e.g. wireless devices such as UEs, network nodes such as base stations etc.

Peer-to-Peer/D2D/Proximity Services (ProSe) Measurements

The radio measurements may be also performed by a device/node based on a radio signal transmitted by another device/node. Such measurements are also referred to as peer-to-peer/D2D/ProSe measurements.

Measurement Report Mapping

EXAMPLE 1

An example existing measurement report mapping for UE Rx-Tx measurements is as in Table 1 in FIG. 1d. This measurement report mapping is used for reporting UE Rx-Tx measurements via RRC, LTE Positioning Protocol annex (LPPa), and LTE Positioning Protocol (LPP).

EXAMPLE 2

An example existing measurement report for RSTD measurements is as in Table 2 in FIG. 2b. The measurement may be reported via LPP.

Positioning in LTE

Several positioning methods for determining the location of the target device, which may be any of the wireless device or UE, mobile relay, PDA, wireless device for machine type communication (aka machine to machine communication), laptop mounting wireless devices or equipment, etc. exist. The position of the target device is determined by using one or more positioning measurements, which may be performed by a suitable measuring node or the target device. Depending upon the positioning method used the measuring node may either be the target device itself, a separate radio node (i.e. a standalone node), serving and/or neighbouring nodes of the target device etc. Also depending upon the positioning method the measurements may be performed by one or more types of measuring nodes.

The LTE architecture explicitly supports location services by defining the Evolved Serving Mobile Location Centre (E-SMLC) that is connected to the core network (i.e. Mobility Management Entity (MME)) via the so called Location application Protocol (LCS-AP) interface and the Gateway Mobile Location Centre (GMLC) that is connected to the MME via the standardised Lg interface. The LTE system may support a range of methods to locate the position of the target devices (e.g. UEs) within the coverage area of the Radio Access Network, RAN. These methods differ in accuracy and availability. Typically, satellite based methods (Assisted Global Navigation Satellite Systems (GNSS)) are accurate with a (few) meter(s) of resolution, but may not be available in indoor environments. On the other hand, Cell ID based methods are much less accurate, but have high availability. Therefore, LTE uses Assisted-Global Positioning System, A-GPS, as the primary method for positioning, while Cell-ID and OTDOA based schemes serve as fall-back methods.

In LTE the positioning node (aka E-SMLC or location server) may configure the target device (e.g. UE), eNodeB or a radio node dedicated for positioning measurements (e.g. LMU) to perform one or more positioning measurements depending upon the positioning method. The positioning measurements may be used by the target device or by a measuring node or by the positioning node to determine the location of the target device. In LTE the positioning node may communicate with the UE using LTE positioning protocol (LPP) and with eNode B using LTE positioning protocol annex (LPPa).

An example LTE positioning architecture is shown in FIG. 3. The three key network elements in an LTE positioning architecture are the (Location Service) LCS Client, the LCS target and the LCS Server. The LCS Server may be a physical or logical entity managing positioning for an LCS target device by collecting measurements and other location information, assisting the terminal in measurements when necessary, and estimating the LCS target location. An LCS Client may be a software and/or hardware entity that may interact with an LCS Server for the purpose of obtaining location information for one or more LCS targets, i.e. the entities being positioned. LCS Clients may also reside in the LCS targets themselves. An LCS Client may send a request to the LCS Server to obtain location information, and the LCS Server may process and serve the received requests and send the positioning result and optionally a velocity estimate to the LCS Client. A positioning request may be originated from the terminal or a network node or external client.

Figure 4:
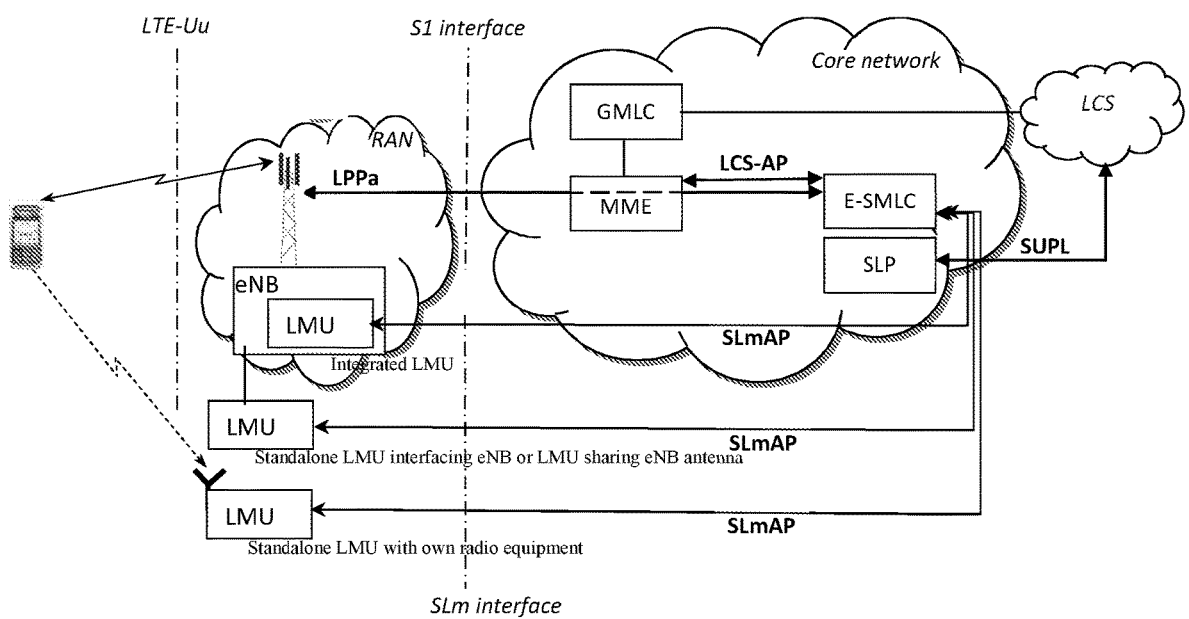
FIG. 4 illustrates an example positioning architecture in LTE with LMU nodes.

Another example is depicted in FIG. 4. FIG. 4 illustrates an example of an architecture for UL positioning (e.g. UTDOA). Although UL measurements may in principle be performed by any radio network node (e.g. eNodeB), UL positioning architecture may include specific UL measurement units (e.g. LMUs) which e.g. may be logical and/or physical nodes, may be integrated with radio base stations or sharing some of the software or hardware equipment with radio base stations or may be completely standalone nodes with own equipment (including antennas). There is an interface, SLm, between the E-SMLC and LMU. The interface is terminated between a positioning server (E-SMLC) and LMU. It may be used to transport SLmAP protocol messages over the E-SMLC-to-LMU interface. Several LMU deployment options are possible. For example, an LMU may be a standalone physical node, it may be integrated into eNodeB or it may be sharing at least some equipment such as antennas with eNodeB—these three options are illustrated in the FIG. 4.

Positioning measurements may be performed on DL radio signals (e.g. Cell-specific Reference Signals (CRS) or Positioning Reference Signals (PRS)) or signals transmitted by a radio network node, UL radio signals (e.g. Sounding Reference Signals, SRS) or signals transmitted by a wireless device to a network or another wireless device, or satellite radio signals. The measurements may be intra-frequency, inter-frequency, or inter-RAT. Positioning measurements are performed by a measuring node, which may be a wireless device, a radio base station, or other radio nodes (e.g. LMUs).

Position calculation may be conducted, for example, by a positioning server (e.g. E-SMLC or SUPL Location Platform (SLP) in LTE) or UE. The former approach corresponds to the UE-assisted positioning mode when it is based on UE measurements, whilst the latter corresponds to the UE-based positioning mode.

Many measurements exist already in 3GPP; however, with new deployment types, new features and wireless technology advances there is a need to update the measurement report mapping, e.g. to increase measurement report resolution or extend the range into smaller or larger values or both. One example is indoor positioning being standardised in 3GPP which requires a much better accuracy in the reported measurements than the currently standardized measurement report mapping allows for. The problem and the current embodiments of solutions however are not limited to positioning only.

An illustrative example of a method performed by a first node for transmitting measurement results to a second node may comprise one or more of the steps of:

Step 1: Receiving a measurement request from a third node;
  In one example, the request may be indicative of how the measurement should be reported, e.g. using combined mapping or not.
  In another example, the request may be indicative of the adaptive resolution factor r to be used in the combined measurement report mapping.
Step 2: Obtaining a measurement result (e.g. performing a radio measurement or receiving a measurement result from another node)
Step 3: Determining whether to transmit a measurement result using a combined measurement report mapping or using a single measurement report mapping, wherein the combined measurement report mapping comprises at least two reported levels which jointly represent a single measurement result;
Step 4: If the combined measurement report is to be transmitted then:
  Obtaining the adaptive resolution factor r, and
  Creating a combined measurement report, based on the obtained adaptive resolution r, using the combined measurement report mapping, wherein the combined measurement report mapping comprises at least two reported levels which jointly represent a single measurement result;
Step 5: Sending to a second node at least one measurement result using the combined measurement report.
  In one example, the report may further include the adaptive resolution factor r used to create the measurement report, e.g. when the first node determines r autonomously.

An illustrative example of a method performed by a second node may comprise one or more of the steps of:
Step 0: Sending a measurement request or measurement report configuration to a first node indicative of the adaptive resolution factor r to be used for the measurement report
Step 1: Receiving a combined measurement report from a first node, wherein the combined measurement report mapping comprises at least two reported values which jointly represent a single measurement result and is based on the adaptive resolution factor r indicated in the request, In one example, the report may further include explicitly or an indication of the adaptive resolution factor r used to create the measurement report, e.g. when the first node determines r autonomously.

Step 2: Using the received report for one or more operational tasks

An illustrative example of a method performed by a third node may comprise one or more of the steps of:

Step 1: Determining whether a first node is to transmit at least one measurement result to a second node using a combined measurement report mapping or using a single measurement report mapping, wherein the combined measurement report mapping comprises at least two reported levels which jointly represent a single measurement result;

Step 2: If the combined measurement report mapping is to be used, based on the determination, then
further determine the adaptive resolution factor r to be used in the combined measurement report mapping, and
configure the first node with the information to enable the first node to transmit measurement results using the combined measurement report mapping with the determined adaptive resolution factor r.

In the above the second and the third nodes may or may not be the same.

The methods performed by the first, second and third node may have several possible advantages. One possible advantage is that the methods enable a wireless device (e.g. a UE) and network nodes to use combined measurement report mapping with adaptive resolution. Another possible advantage is that the methods enable reducing signalling overhead on the average. Still a further possible advantage is that the methods enable simplifying the standardising of enhanced measurement report mapping, e.g. to extend the mapping beyond the existing range or to enable finer granularity measurement reporting. The methods further enable adaptive resolution of the reported measurement results, i.e. by the virtue of combined report mapping the same measurement results may be reported with better granularity or resolution if the results are required for task requiring more precision, e.g. positioning for emergency services etc. Otherwise the results may be reported with single report mapping with fewer signalling overheads.

Any two or more embodiments described below may be combined in any way with each other.

Some examples of the first node, second node, and third node (the second and the third nodes may or may not be the same):
a wireless device or a radio network node or radio node in general;
a network node;
a measuring node (i.e. a node capable of performing radio measurements itself);
a node receiving radio measurement results from another node, but not necessarily capable of performing radio measurements itself).

Based on the above, it can be seen that any combination of (first node; second node; third node) is possible, e.g. (UE; eNodeB; eNodeB), (UE; positioning node; positioning node), (UE; positioning node; eNodeB), (eNodeB; eNodeB; O&M or coordinating node), etc. In some embodiments, only the combination (first node; second node) applies.

A wireless device and UE are used interchangeably in the description. A UE may comprise any device equipped with a radio interface and capable of at least generating and transmitting a radio signal to a radio network node. Note that even some radio network nodes, e.g. a relay, an LMU, or a femto Base Station, BS, (aka home BS), may also be equipped with a UE like interface. Some example of "UE" that are to be understood in a general sense are Personal Digital Assistant (PDA), laptop, mobile, sensor, fixed relay, mobile relay, tablet, Machine Type Communication (MTC) or Machine-to-Machine (M2M) device, any radio network node equipped with a UE-like interface (e.g. small Radio Base Station (RBS), eNodeB, femto BS).

A radio node is characterised by its ability to transmit and/or receive radio signals and it comprises at least a transmitting or receiving antenna. A radio node may be a UE or a radio network node. Some examples of radio nodes are a radio base station (e.g. eNodeB in LTE or NodeB in UTRAN), a relay, a mobile relay, Remote Radio Unit (RRU), Remote Radio Head (RRH), tablet, MTC or M2M device, a sensor, a beacon device, a measurement unit (e.g. LMUs), user terminal, PDA, mobile, iPhone, smartphone, laptop, etc.

A measuring node is a radio node performing measurement on radio signals Depending on the embodiments, the measuring node may perform measurements on DL signals (e.g. a wireless device or a radio network node equipped with a UE-like interface, relay, etc.) or UL signals (e.g. a radio network node in general, eNodeB; Wireless Local Area Network (WLAN) access point, LMU, etc.)

A radio network node is a radio node comprised in a radio communications network and typically characterised by own or associated network address. For example, a mobile equipment in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g. a dual-mode user equipment may operate with any one or combination of WiFi and LTE or HSPA and LTE/LTE-A). A radio network node, including eNodeB, RRH, RRU, or transmitting-only/receiving-only nodes, may or may not create own cell and may comprise in some examples a transmitter and/or a receiver and/or one or more transmit antennas or one and/or more receive antennas, where the antennas are not necessarily co-located. It may also share a cell with another radio node which creates own cell. More than one cell may be associated with one radio node. A radio node herein can be a wireless device such as UE or a radio network node such as a base station, access point etc. Further one or more serving cells (in DL and/or UL) may be configured for a UE, e.g. in a carrier aggregation system where a UE may have one Primary Cell (PCell) and one or more Secondary Cells (SCells). Further one or more serving cells (in DL and/or UL) may be configured for a UE in a multi-connectivity system, e.g. in a dual connectivity (DC) system where a UE may have at least one Primary Cell (PCell) from a first network node and at least one primary secondary cell (PSCell) from a second network node and optionally or more Secondary Cells (SCells) from the first and/or the second network nodes.

A network node may be any radio network node or core network node. Some non-limiting examples of a network node are an eNodeB, RNC, positioning node; MME, PSAP, SON node, MDT node, (typically but not necessarily) coordinating node, and O&M node.

Positioning node described in different embodiments is a node with positioning functionality. For example, for LTE it may be understood as a positioning platform in the user plane (e.g. SLP in LTE) or a positioning node in the control plane (e.g. E-SMLC in LTE). Positioning functionality may also be split among two or more nodes, e.g. there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node" used herein Is a network and/or node, which coordinates radio resources with one or more radio nodes. Some examples of the coordinating node are network monitoring and configuration node, Operation Support System (OSS) node, Operation and management (O&M), MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signalling described in the embodiments is either via direct links or logical links (e.g. via higher layer protocols and/or via one or more network and/or radio nodes). For example, signalling from a coordinating node may pass another network node, e.g. a radio network node.

The embodiments are not limited to LTE, but may apply with any Radio Access Network (RAN), single- or multi-RAT. Some other RAT examples are LTE-Advanced, UMTS, HSPA, GSM, cdma2000, WiMAX, and WiFi.

The term measurement may refer herein to a radio signal measurement, e.g. as described in "Radio signal measurements", which may be a DL measurement, an UL measurement, a bi-directional measurement (e.g. Rx-Tx or RTT), a peer-to-peer or D2D or ProSe measurement, etc.

Combined Measurement Reports

Some examples of a single measurement report mapping are described in "Measurement Report Mapping".

A combined measurement report mapping comprises at least two reported levels (e.g. R1 and R2), which jointly represent a single measurement result (e.g. M), i.e. the reported measurement result (e.g. R) is uniquely derived as a function of R1 and R2: R=f(R1, R2). There may be, however, one or more combinations of (R1, R2) which can map to a single value R. There is also a relation between M and R. For example, R may be derived from M by rounding to the closest integer, closest integer so that R<M, closest integer so that R>M, closest value from a pre-defined table, etc. Hence, the relation may be described in more general terms as follows:

$$M > (R1, R2, \ldots, Rn) > R,$$

$$R = f(R1, R2, \ldots, Rn)$$

The mapping may be based on one or more tables. A combined measurement report is based on a combined measurement report mapping.

The term 'combined measurement report mapping' or 'combined measurement reporting range' may also interchangeably be called as multi-level (or M-level) report mapping or composite report mapping.

When adaptive resolution (e.g., represented by a factor r) is additionally used with the combined measurement report, then the reported quantity may further depend on r, e.g.:

$$R = f(R1, R2, \ldots, Rn, r)$$

In another embodiment, there may also be a relation between r and at least one of R1, R2, . . . , Rn, e.g., R2 may only be allowed to be a multiple of r.

General Examples

In one embodiment, R1 is a reference level, R2 is a relative level with respect to the reference level and R=R1+R2 or R=R1−R2.

In another embodiment, R1 is based on a first pre-defined table, R1 is a closest level (from the first table) to M, R2 is based on a second pre-defined table so that R=R1+R2 and R is the closest level to M among all combinations (R1 ,R2). Thus, the selection of (R1 ,R2) may be described, e.g. as minimizing the absolute difference between M and R:

$$\mathrm{abs}(M-R)=\mathrm{abs}(M-(R1,R2))>\min$$

In yet another embodiment, R2 (when R=f(R1,R2)) is used to increase the resolution of a reportable value to represent measurement M, compared to the case when R would be based on the first table only (e.g. R=f(R1)). That is, the first table contains at least one R1' and one R1", so that R1'<R1<R1', and R1'<R1<f(R1,R2)<R1".

In yet another example, R2 is used to extend the upper range of a reportable value to represent measurement M. That is, f(R1,R2)>R1=max{R1'}, where max{R1'} is the maximum value from the first table. In yet another example, R2 is used to extend the lower range of a reportable value to represent measurement M. That is, f(R1,R2)<R1=min{R1'}, where min{R1'} is the minimum value from the first table.

More Specific Examples

Example 1: New RSTD Mapping with Relative Values $\Delta_{RSTD}$ and adaptive resolution factor r.

The reporting range of higher-resolution RSTD is defined from $-15391\ T_S$ to $15391\ T_S$ with the adaptive resolution factor r.

The UE shall in this example report a reference quantity and a relative quantity $\Delta_{RSTD}$ according to Table 3 FIG. 5a, where the mapping of the relative quantity $\Delta_{RSTD}$ is specified in Table 4 FIG. 5b, and the mapping of the reference quantity is specified in Table 3.

Once the first node, i.e. the UE in this example, has obtained the measurement result, the UE creates a combined measurement report.

In this example, to report RSTD=−4099.4 Ts, an old UE would report only RSTD_2259, while the new UE would report a combined measurement report with two values (RSTD_2259, RSTD_delta_3) which would mean that with e.g. r=0.5 the reported measurement corresponds to an RSTD measurement within the range [−4099.5; −4099] (−4099.5=−4101+1.5; −4099=−4101+1.5+0.5) which contains the true measured RSTD instance −4099.4 Ts. With the general notation used above, this would correspond to:
M=−4099.4,
R1=−4101,
R2=1.5,
R=−4099.5,
if the lower bounds are taken to represent a range, e.g., R1=−4101 to represent the legacy range (based on Table 2 in FIG. 2b) −4101<RSTD<−4096, and R=−4099.5 to represent the new range −4099.5<=RSTD<=−4099 which better approximates the actual measurement M than the legacy range.

The UE may have obtained the adaptive resolution factor r autonomously or in e.g. a request from a second node. The request may further comprise the combined mapping, e.g. by means of the two report values (which may also be referred to as report levels in this disclosure) RSTD_2259 and RSTD_delta_3. Thus; based on the obtained measurement result and using the combined measurement report mapping and the adaptive resolution, the UE creates the combined measurement report as described above.

NOTE: there may be some relation between $\Lambda_{RSTD}$ and r, e.g. $\Lambda_{RSTD}$ should/could/may be a multiple of r.

With the note above, with r=1 in this example, R2=1.5 would not be possible. So, for r=1, we would get:
M=−4099.4,
R1=−4101,
R2=1,
R=−4100 (or [−4100; −4099]) which is a larger and thus less accurate interval than with r=0.5.
And for r=2, we would get:
M=−4099.4,
R1=−4101,
R2=0,
R=−4101 (or [−4101; −4099]).which is less accurate than with r=1 but more accurate than with legacy reporting (R1=R=−4101 corresponding to [−4101; −4096]).

Example 2: Combined Measurement Report Mapping with a Pre-Defined Value for the Adaptive Resolution Factor r Same as Example 1, but with a pre-defined value of the adaptive resolution factor r, e.g. r=0.5 Ts. We would get then mappring according to e.g. Table 5 in FIG. 5c.

Methods In, or Performed By, a First Node

In this part of the disclosure a method in a first node for transmitting measurement results to a second node is described comprising one or more of the steps of:

Step 1: Receiving a measurement request from a third node;
  In one example, the request may be indicative of how the measurement should be reported, e.g. using combined mapping or not
  In another example, the request may be indicative of the adaptive resolution factor r to be used in the combined measurement report mapping.
Step 2: Obtaining a measurement result (e.g. performing a radio measurement or receiving a measurement result from another node)
Step 3: Determining whether to transmit a measurement result using a combined measurement report mapping or using a single measurement report mapping, wherein the combined measurement report mapping comprises at least two reported levels which jointly represent a single measurement result;
Step 4: If the combined measurement report is to be transmitted, then
  Obtaining the adaptive resolution factor r, and
  Creating a combined measurement report, based on the obtained adaptive resolution r, using the combined measurement report mapping, wherein the combined measurement report mapping comprises at least two reported levels which jointly represent a single measurement result;
Step 5: Sending to a second node at least one measurement result using the combined measurement report.

In one example, the report may further include the adaptive resolution factor r used to create the measurement report, e.g. when the first node determines r autonomously.

The adaptive resolution factor r may also use more than one value for reporting the same type of measurement (e.g. RSTD). For example the value of r may depend on the resolution of the reference measurement quantity. As an example assume that the resolutions of the reference quantity is 1 unit for 64 reportable values in the centre of the reporting range and 4 units for 64 reportable values in the flanks (lower and upper parts) of the reporting range. In this case as an example r=0.5 unit for the 64 central reportable values and r=1 for the 64 outer reportable values More specifically in table 1 for RSTD the r=0.5 Ts may be used for reference quantity value ranges between RSTD_2262 and RSTD_10449 whereas r=1Ts may be used for reference quantity value ranges between RSTD_000 and RSTD_2261 and between RSTD_10450 and RSTD_2711. This may apply to any embodiment herein, e.g. in "Methods in, or performed by, a first node", "Methods in, or performed by, a second node", or "Methods in, or performed by, a third node".

The order of the one or more steps above may be different and there may also be other steps too.

In the above, the measurement may be any measurement, e.g. as described in "Radio signal measurements".

Step 1: Receiving a Measurement Request

Optional Step.

In one embodiment, the received measurement request may comprise a measurement configuration, assistance data for performing measurements, desired or requested measurement accuracy or positioning accuracy, positioning method, etc.

In another embodiment, the received measurement request may also comprise at least one parameter associated with measurement reporting. In one example, the parameter may be indicative of whether the measurement reporting should be based on a single measurement report mapping or a combined measurement report mapping. In a further example, the parameter is a binary indicator.

In one example, the request may be indicative of how the measurement should be reported, e.g. using combined mapping or not.

In another example, the request may be indicative of the adaptive resolution factor r (e.g. r=0.5 Ts) to be used in the combined measurement report mapping.

In yet another example, the request may be indicative of how the adaptive resolution factor r is determined, e.g. a pre-defined value or a variable which may be obtained autonomously by the first node.

See also methods in a third node.

Step 2: Obtaining a Measurement Result

The first node obtains a measurement result to be signalled to another node. The obtaining may comprise, e.g. performing the radio measurement or receiving the measurement result from yet another node.

The combined measurement report is described in detail in "Combined Measurement Reports" above. Merely as an illustrative example, assume that a reported reference quantity value of RSTD_2258 in table 3 in FIG. 5a is to be reported. Then the range of measured RSTD value is between −4106 and −4101. Assuming that the reported relative quality value RSTD_delta_1 is to be used as a relative quantity mapping for higher-resolution RSTD measurement reporting, see table 4 or FIG. 5b. RSTD_delta_1 equals 0.5, wherein the actual RSTD value is −4106+0.5=−4105.5. with a resolution factor r of 0.5, the actual RSTD value is −4105.5+0.5=−4105.

Consequently, the measurement reporting accuracy may be increased as the RSTD value −4105 may be used instead of the range between −4106 and −4101.

The values and/or levels "−4106" and "−4101" in the example above may be examples of some first report values and/or report levels. These first report values and/or report levels may be associated with a first report range. An example of a first report range may be e.g. RSTD_2258 as used above.

In analogy, the value and/or level "0.5"" in the example above may be an example of a second report value and/or report level. This second report value and/or report level may be associated with a second report range. An example of a second report range may be e.g. RSTD_delta_1 as used above.

The first report range may represent a first granularity and/or resolution. The second report range may represent a second granularity and/or resolution.

A combined measurement report may be created and/or obtained by mapping an obtained measurement value to a first report range. The obtained measurement value lies within the first report range.

Step 3: Determining Which Report Type to Transmit
Optional Step.

The first node determines whether to transmit the obtained (in Step 2) measurement result using a combined measurement report mapping or using a single measurement report mapping (see "Combined Measurement Reports").

The determining may be based, e.g. on one or more of:
Measurement type e.g. use combined report for OTDOA RSTD, use combined report for any positioning measurement,
the received measurement request (see Step 1) or another signalling from another node,
measurement quality or measurement accuracy,
measurement requirement e.g. use combined report if the measurement accuracy is worse than a threshold and/or if signal quality is below a threshold. This is because combined report will ensure lower overall error due to smaller quantization error. For example if RSRP is measured at SINR≤−3 dB then the UE may always send the report using the combined measurement report mapping,
measurement purpose (e.g. higher granularity when the measurement is intended for purpose A while a worse granularity may be acceptable for purpose B). For example if the measurement is used for specific purpose. Examples of such purposes are positioning or particular type of positioning like indoor positioning or positioning for emergency calls, critical MTC which requires measurements with higher reliability etc.,
environment type or deployment scenario e.g. indoor, outdoor, small cell, larger cell, suburban or rural, urban (e.g. higher granularity and combined measurement reporting can be used in indoor environment),
Radio conditions or radio environment e.g. radio channel with larger delay spread of multi-paths, radio channel with higher Doppler. For example the first node may use combined report measurement report mapping to enable better resolution when radio conditions are more difficult or harsher e.g. delay spread is above a threshold and/or Doppler speed is higher. This is because under harsher conditions the measurement accuracy may become worse,
release of the first node (e.g. from Release N of the standard or the specification such as a 3GPP specification where only combined measurement reporting mapping is used, while a single measurement report mapping is used before the publication of Release N of the same specification),
positioning quality or positioning accuracy,
verifying that at least one of the levels (R1, R2, . . . , Rn) meets one or more conditions or at least one characteristic of the radio conditions in which the measurement is performed meets one or more criteria (e.g. better granularity may be needed for the measurements performed in better radio conditions and a worse granularity may be acceptable for the measurements typical for worse radio conditions such as better granularity for RSRP>−70 dBm or for RSRQ>−6 dB or for Rx-Tx<1000Ts, etc).
Type of receiving node e.g. whether the target node receiving the report is a UE or a network node.
Available resources or overheads for signalling measurement results. For example use combine reports if there sufficient resources to report measurement results. Otherwise if they are limited resources then the first node may use signal measurement report mapping.

From the above, e.g. $4^{th}$ and $7^{th}$ bullet, the adaptive resolution factor may be selected based on the measurement result. For example: 0.5 Ts if the absolute measurement result is below a threshold, and 1 Ts if the absolute measurement result is at or above the threshold.

Step 4: Creating a Combined Measurement Report

The first node creates a combined measurement report for the obtained measurement result.

The first node may decide to transmit a combined measurement report, either always or selectively (see Step 3 above).

The combined measurement report is created based on the obtained adaptive resolution factor r.

Methods of Obtaining the Adaptive Resolution Factor r
The adaptive resolution factor r may be one or more of:
Pre-defined or pre-configured, e.g. r=0.5 Ts for positioning with small cells and/or indoor,
Selected from a pre-defined or pre-configured set of values for r, e.g. {0.5 Ts, 1 Ts, 2.5 Ts, 5 Ts},
Received from another node, e.g. from the third node or from the second node,
Variable and determined autonomously by the first node (e.g. UE), where the determination may be based, e.g. on one or more of:
measurement type. For example smaller value of r is selected for measurements which require better measurement accuracy e.g. positioning measurement. Larger value of r may be selected for measurements involving less accuracy e.g. best effort measurement for network planning such as MBSFN RSRP, MBSFN RSRQ etc.,
channel conditions. Smaller value of r may be used in case channel conditions are more stringent. This may ensure that overall measurement accuracy of the reported measurement is least affected by r. Examples of stringent radio conditions are: when UE speed is above a threshold (e.g. 50 km/hr), when channel delay spread is above a threshold (e.g. 1 µs) etc.,
interference conditions When interference is higher (e.g. total received interference power is above a threshold (e.g. −70 dBm) then smaller value of r may be used to enhance overall reported measurement accuracy, environment type (e.g. indoor or outdoor), desired or required measurement accuracy, desired or required location accuracy if the measurement is to be used for determining location, etc., deployment type and/or cell size, e.g. a smaller r may be used for small cells, availability of resources for measurements The first node may share its resources (e.g. memory and/or processors) for doing measurements and for other purposes. If the first node has limited available resources for the measurement then it may use a coarser value of r (e.g. r=1 Ts instead of 0.5 Ts for timing measurement), number of parallel measurements at a certain time point or over a certain time interval, e.g. when multiple measurements are performed in parallel, it may be more challenging for the UE to achieve very high accuracy for all the parallel measurements, e.g. due to limited resources or the measurement time constraint for each of the parallel measurements, and thus a coarser resolution may be more reasonable, historical data or statistics. For determining the value of r for a certain type of measurement, the first node may consider the statistics or historical data related to the values of r used in the past for reporting the same type of measurement to the second node. For example if the earlier reported results based on certain value of r led to successful radio operations (e.g. positioning, cell change etc.) with higher probability (e.g. 90% or more) then the first node may use the same value of r for reporting the measurement results.

desired or required performance (the performance target may be pre-defined, associated with a service, associated with QoS, requested/configured/indicated by another node, decided by the measuring node, etc.), e.g.:

measurement target accuracy, or desired or required location accuracy if the measurement is to be used for determining location.

From the $1^{st}$, $2^{nd}$ and $3^{rd}$ sub-bullet 1 under the fourth main bullet, it can be concluded that the resolution factor may selected among a factor of 0.5 and 1.0, if the measurement result is below a threshold.

Step 5: Sending the Combined Measurement Report

The combined measurement report is sent to a second node (see "General Examples").

In one example, the report may further include the adaptive resolution factor r used to create the measurement report, e.g. when the first node determines r autonomously.

Methods In, or Performed By, a Second Node

In this part of the disclosure, a method in a second node is described comprising one or more of the steps of:

Step 0: Sending a measurement request or measurement report configuration to a first node indicative of the adaptive resolution factor r to be used for the measurement report.

In one example, the request may be indicative of how the measurement should be reported, e.g. using combined mapping or not.

In another example, the request may be indicative of the adaptive resolution factor r (e.g. r=0.5 Ts) to be used in the combined measurement report mapping.

In yet another example, the request may be indicative of how the adaptive resolution factor r is determined, e.g. a pre-defined value or a variable which may be obtained autonomously by the first node.

Step 1: Receiving a combined measurement report from a first node, wherein the combined measurement report mapping comprises at least two reported levels which jointly represent a single measurement result and is based on the adaptive resolution factor r indicated in the request.

In one example, the report may further include explicitly or an indication of the adaptive resolution factor r used to create the measurement report, e.g. when the first node determines r autonomously.

Step 2: Using the received report for one or more operational tasks.

Step 0: Sending a Measurement Request or a Measurement Report Configuration

See step 1 in "Methods in, or performed by, a first node" and/or "Receiving a measurement request".

Step 1: Receiving a Combined Measurement Report From a First Node

The receiving may be via higher layers. Some example protocols: RRC, LPP, LPPa, X2, proprietary protocols, etc.

Step 2: Using the Received Report for One or More Operational Tasks

In one embodiment, in this step, the receiving node may derive or assemble the reported measurement value (e.g. R) from the received combined measurement report (comprising, e.g. R1 and R2) and use the result of deriving or assembling for one or more operational tasks.

In another embodiment, in this step, the receiving node may directly use (e.g. using R1 and R2 and not deriving R) the values from the received combined measurement report for one or more operational tasks.

Some examples of the operational tasks are:

Determining location of the first node;

Storing at least one of the extracted values (e.g. R1 and R2) and the derived values (e.g. R) from the received measurement report in an internal or external database, Signalling to yet another node, Use the results for performing mobility e.g. cell change, handover etc., RRM operation e.g. adjusting one or more parameters related to scheduling, power control, admission control, SON e.g. tuning of parameters used in the network nodes such as transmit power level, MDT e.g. for network planning and deployment of new nodes, upgrading existing nodes etc.

Methods In, or Performed by, a Third Node

In this part of the disclosure, a method in a third node (see also [00067]-[0079] above) is described comprising one or more of the steps of:

Step 1: Determining whether a first node is to transmit at least one measurement result to a second node using a combined measurement report mapping or using a single measurement report mapping, wherein the combined measurement report mapping comprises at least two reported levels which jointly represent a single measurement result;

Step 2: If the combined measurement report mapping is to be used, based on the determination, then further determine the adaptive resolution factor r to be used in the combined measurement report mapping, and configure the first node with the information to enable the first node to transmit measurement results using the combined measurement report mapping with the determined adaptive resolution factor.

Step 1: Determining Whether the Combined or a Single Measurement Report Mapping is to Be Used By the First Node The methods of determining may be similar to those described for Step 3 in "Methods in, or performed by, a first node".

Step 2: Configunng the First Node to Enable Combined Measurement Report Mapping

See also Step 1 and Step 3 in "Methods in, or performed by, a first node". For example, the configuring may comprise sending an indication to trigger a certain configuration or sending a configuration message to the first node (the configuration message may be received by the first node in Step 1 as described in "Methods in, or performed by, a first node").

Methods of Determining the Adaptive Resolution Factor r

The third node may determine one or plurality of values of r for the same type of measurement quantity (e.g. RSTD). For example the value of r may be used by the first and the second nodes for reference measurement quantities, which have the same resolution e.g. r=0.1 Ts for the reference measurement quantity (e.g. RSTD) with 1 Ts of resolution, r=1 Ts for the reference measurement quantity (e.g. RSTD) with 5 Ts of resolution and so on.

The adaptive resolution factor r may be one or more of:
- Pre-defined or pre-configured, e.g. r=0.5 Ts for positioning with small cells and/or indoor,
- Selected from a pre-defined or pre-configured set of values for r, e.g. {0.5 Ts, 1 Ts, 2.5 Ts, 5 Ts},
- Received from another node, e.g. from the third node or from the second node,
- Variable and determined autonomously by the first node (e.g. UE), where the determination may be based, e.g. on one or more of:
  - measurement type. For example smaller value of r is selected for measurements which require better measurement accuracy e.g. positioning measurement. Larger value of r can be selected for measurements involving less accuracy e.g. best effort measurement for network planning such as MBSFN RSRP, MBSFN RSRQ etc.,
  - channel conditions. Smaller value of r is used in case channel conditions are more stringent. This will ensure that overall measurement accuracy of the reported measurement is least affected by r. Examples of stringent radio conditions are: when UE speed is above a threshold (e.g. 50 km/hr), when channel delay spread is above a threshold (e.g. 1 µs) etc.,
  - interference conditions. When interference is higher (e.g. total received interference power is above a threshold (e.g. −70 dBm) then smaller value of r is used to enhance overall measurement accuracy,
  - environment type (e.g. indoor or outdoor), desired or required measurement accuracy, desired or required location accuracy if the measurement is to be used for determining location, etc.,
  - deployment type and/or cell size, e.g. a smaller r may be used for small cells.
  - Availability of resources for measurements. The first node may share its resources (e.g. memory and/or processors) for doing measurements and for other purposes. If the first node has limited available resources for the measurement then it may use a coarser value of r (e.g. r=1 Ts instead of 0.5 Ts for timing measurement),
  - Number of parallel measurements at a certain time point or over a certain time interval, e.g. when multiple measurements are performed in parallel, it may be more challenging for the UE to achieve very high accuracy for all the parallel measurements, e.g. due to limited resources or the measurement time constraint for each of the parallel measurements, and thus a coarser resolution may be more reasonable.
  - Historical data or statistics For determining the value of r for a certain type of measurement, the first node may consider the statistics or historical data related to the values of r used in the past for reporting the same type of measurement to the second node. For example if the earlier reported results based on certain value of r led to successful radio operations (e.g. positioning, cell change etc.) with higher probability (e.g. 90% or more) then the first node may use the same value of r for reporting the measurement results.
  - desired or required performance (the performance target may be pre-defined, associated with a service, associated with QoS, requested/configured/indicated by another node, decided by the measuring node, etc.), e.g.:
    - measurement target accuracy, or
    - desired or required location accuracy if the measurement is to be used for determining location, where a finer resolution would be selected when a higher accuracy is needed.

Embodiments herein relate to a method performed by a first node, i.e. a wireless device in a wireless communication network for providing a measurement result to a second node is provided. Embodiments of such a method will now be described with reference to FIGS. 6a-6c.

Figure 6A:
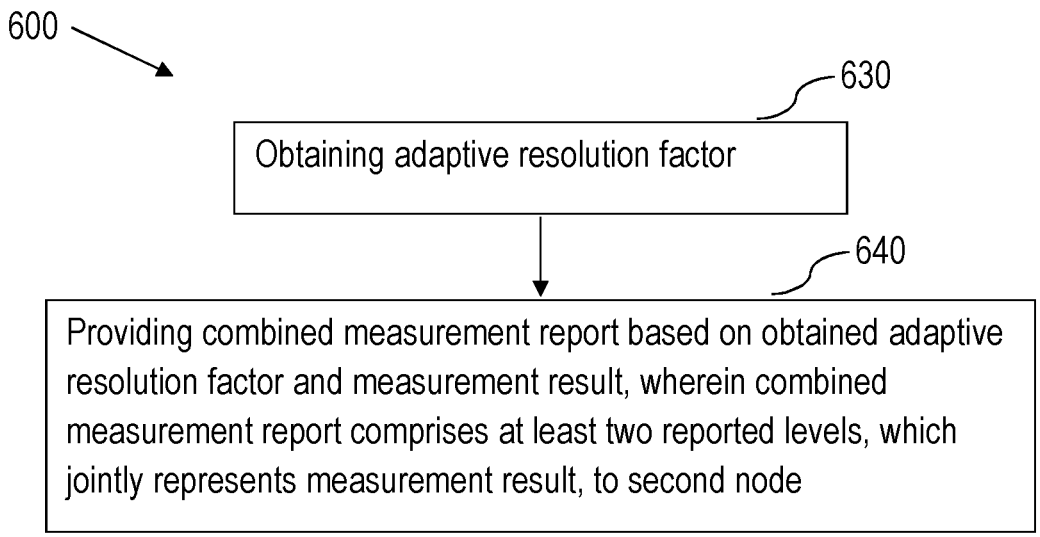
FIG. 6a is a flowchart of a method performed by a wireless device for providing a measurement result to a second node, according to an exemplifying embodiment.

FIG. 6a illustrates the method 600 comprising obtaining 630 an adaptive resolution factor, and providing 640 a combined measurement report based on the obtained adaptive resolution factor and a measurement result, wherein a combined measurement report comprises at least two reported levels, which jointly represents the measurement result to the second node.

The adaptive resolution factor enables the wireless device to e.g. provide a more exact measurement report to the second node. As described above, the adaptive resolution factor may be obtained in various ways as described above in "Methods of obtaining the adaptive resolution factor r". For example, the adaptive resolution factor may be obtained by being pre-defined or pre-configured, e.g. r=0.5 Ts for positioning with small cells and/or indoor, by selection from a pre-defined or pre-configured set of values; by being received from another node; and/or by being determined autonomously by the first node, i.e. the wireless device. An example of receiving the adaptive resolution factor from another node is receiving a measurement request herein also referred to as a measurement report request, see "Step 1: Receiving a measurement request". The may be comprised in such a measurement request received from another node, e.g. the third node.

Once the wireless device has obtained the adaptive resolution factor, the wireless device may create the combined measurement report based on the obtained adaptive resolution factor and the measurement result. The wireless device may then provide the combined measurement report to the second node, e.g. by transmitting the combined measurement report to the second node.

Figure 6B:
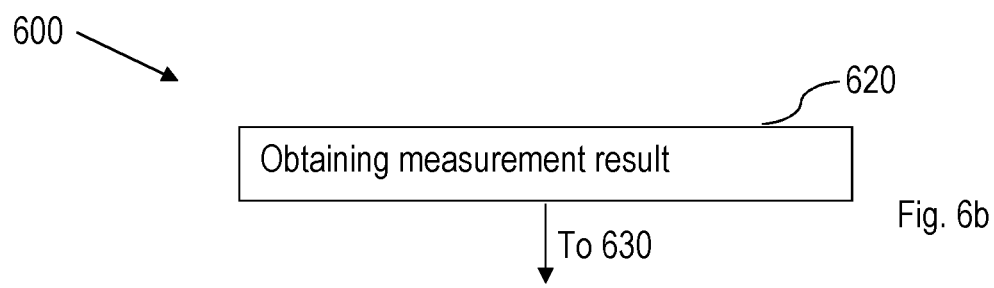
FIG. 6b is a flowchart of a method performed by a wireless device for providing a measurement result to a second node, according to another exemplifying embodiment.

The method 600 may further comprise, as illustrated in FIG. 6b, obtaining the above mentioned measurement result.

Also as described above, the measurement result may be obtained by performing one or more radio measurements or by receiving the measurement result from yet another node, which in such a case may have performed one or more radio measurements.

As described above, e.g. in "Methods of obtaining the adaptive resolution factor r" 1, there are a number of different ways for the wireless device to obtain the adaptive resolution factor. In one example, the adaptive resolution factor is obtained from a third node of the wireless communication network. In another example, the adaptive resolution factor is obtained from based on pre-defined information. In yet an example, the adaptive resolution factor is obtained by a selection based on the measurement result.

The combined report may be used if the measurement accuracy is worse than a threshold and/or if signal quality is below a threshold. This is because combined report will ensure lower overall error due to smaller quantisation error For example if RSRP is measured at SINR$\leq$<−3 dB then the UE may always send the report using the combined measurement report mapping. Further, the wireless device may use combined report measurement report mapping to enable better resolution when radio conditions are more difficult or harsher e.g. delay spread is above a threshold and/or Doppler speed is higher. This is because under harsher conditions the measurement accuracy may become worse. In other words, the measurement result itself may cause the wireless device to select an appropriate adaptive resolution factor in order to improve the measurement report provided to the second node.

The combined measurement report provided to the second node may comprise an indication of the obtained adaptive resolution factor.

In order for the second node to more easily interpret the measurement report, the wireless device may insert the indication of the obtained adaptive resolution factor into the combined measurement report that is provided to the second node, in this manner, the second node may apply the adaptive resolution factor to the received measurement report and more easily interpret the information comprised therein.

Figure 6C:
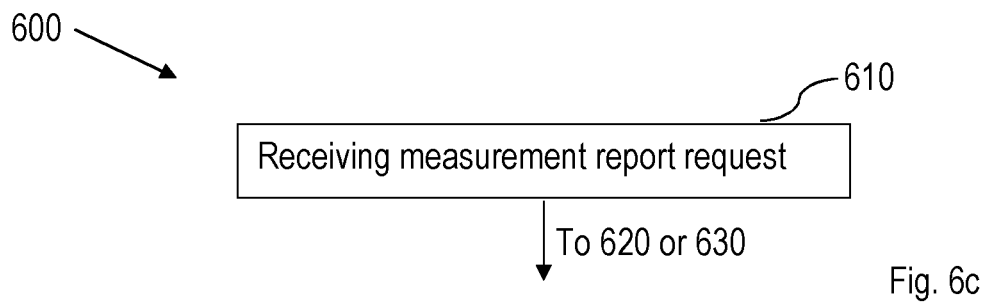
FIG. 6c is a flowchart of a method performed by a wireless device for providing a measurement result to a second node, according to a further exemplifying embodiment.

The method 600 may further comprise, as illustrated in FIG. 6c, receiving 610 a measurement report request from a third node of the wireless communication network.

There may be various triggers for the wireless device to send a measurement report to the second node. For example, the wireless device may provide measurement reports to the second node regularly at predetermined time intervals, upon an event that has occurred or in response to receiving a request requesting the wireless device to send a measurement report. See also "Step 1: Receiving a measurement request". As stated above, the measurement report request is also referred to as measurement request in this disclosure.

The measurement report request may comprise the combined measurement report mapping and/or the adaptive resolution factor.

As described above, there are various ways for the wireless device to obtain the adaptive resolution factor. In this example, the adaptive resolution factor may be comprised in the measurement report request or may be deduced from the combined measurement report. In this manner, the measurement report request provides the necessary information to the wireless device in order for the wireless device to provide a combined measurement report accordingly. As described above in "Methods in, or performed by, a first node", in Step 1: the request, i.e. the measurement report request, may be indicative of the adaptive resolution factor r to be used in the combined measurement report mapping.

As described above, the obtaining of the measurement results may comprise (a) performing a radio measurement on a received signal or receiving the measurement result from another node; or (b) receiving the measurement result from another node. See e.g. "Methods in, or performed by, a first node", step 2.

The resolution factor may be a factor of 0.5, i.e. one or more or 0.5, 1.0, 1.5, 2.0, 2.5, 3.0, 3.5, 4.0 etc.

Looking at Table 4 in FIG. 5b, examples of values of the adaptive resolution factor is given. See also example in "Step 2: Obtaining a measurement result". The adaptive resolution factor can be said to narrow a range or interval of a reported reference quality value, see e.g. Table 3 in FIG. 5a.

There may be various reasons for selecting the adaptive resolution factor. The resolution factor may be selected among a factor of 0.5 and 1.0, if the measurement result is below a threshold.

The value of the adaptive resolution factor may be reflective of the need of accuracy. For example, smaller value of the adaptive resolution factor may be selected for measurements which require better measurement accuracy e.g. positioning measurement. Larger value of the adaptive resolution factor may be selected for measurements involving less accuracy e.g. best effort measurement for network planning. Further, smaller value of the adaptive resolution factor may be used in case channel conditions are more stringent. This may ensure that overall measurement accuracy of the reported measurement is least affected by the adaptive resolution factor. Examples of stringent radio conditions are: when UE speed is above a threshold (e.g. 50 km/hr), when channel delay spread is above a threshold (e.g. 1 µs) etc. When interference is higher (e.g. total received interference power is above a threshold (e.g. −70 dBm) then smaller value of r may be used to enhance overall measurement accuracy. Consequently, different thresholds may be associated with measurement type, channel conditions and interference conditions. Depending on the accuracy required, the adaptive resolution factor may be 0.5 or 1.0 depending on the measurement result in relation to one or more thresholds.

Embodiments herein relate to a method performed by a second node in a wireless communication network for obtaining a measurement result from a first node, i.e. a wireless device, is provided. Embodiments of such a method will now be described with reference to FIGS. 7a-7b. The second node may e.g. be a radio network node, in turn being e.g. a radio base station, eNodeB, a positioning node or a measuring node.

Figure 7A:
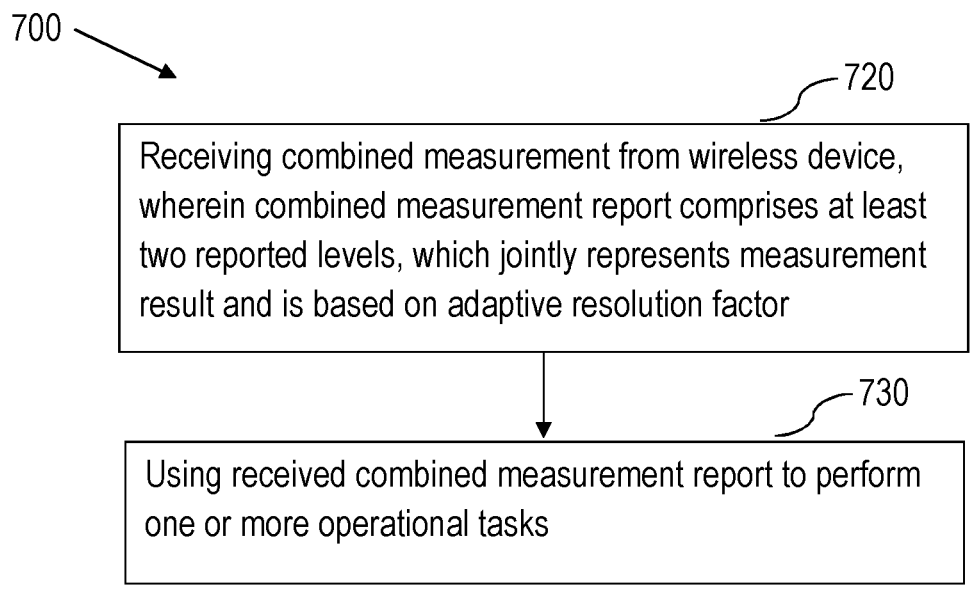
FIG. 7a is a flowchart of a method performed by a second node for obtaining a measurement result from a wireless device, according to an exemplifying embodiment.

FIG. 7a illustrates the method 700 comprising receiving 720 a combined measurement from the wireless device, wherein the combined measurement report comprises at least two reported levels, which jointly represents a measurement result and is based on an adaptive resolution factor; and using 730 the received combined measurement report to perform one or more operational tasks.

As described above, the wireless device provides the combined measurement report to the second node, e.g. by transmitting the report to the second node, wherein the second node receives the combined measurement report from the wireless device. See also "Methods in, or performed by, a second node", Step 1. The combined measurement report comprises at least two reported levels, which jointly represents a measurement result and is based on the adaptive resolution factor. By means of the at least two reported levels based on the adaptive resolution factor a more accurate report is provided to the second node. The second node may then perform one or more operational tasks using the received combined measurement report. Some examples of the operational tasks are given in "Step 2: Using the received report for one or more operational tasks" above. By the combined measurement report being more accurate due to the at least two reported levels based on the adaptive resolution factor the operational task may e.g. in turn be performed with better accuracy.

Figure 7B:
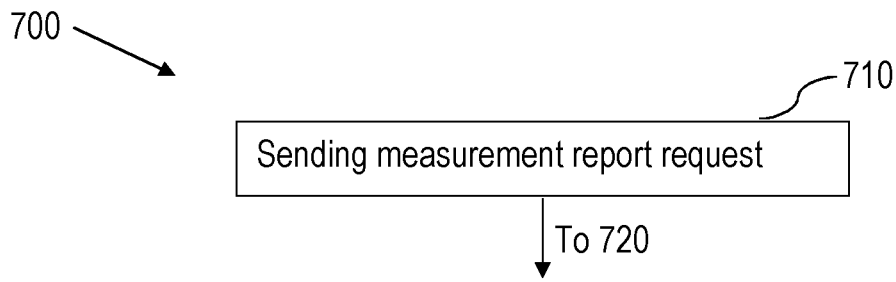
FIG. 7b is a flowchart of a method performed by a second node for obtaining a measurement result from a wireless device, according to another exemplifying embodiment.

The method 700 may further comprise, as illustrated in FIG. 7b, sending 710 a measurement report request to the wireless device.

As described above, the wireless device may be triggered in various ways to send the combined measurement report to the second node. One example of how the wireless device may be triggered to send the combined measurement report to the second node is upon request. The second node may determine that it needs or requires a combined measurement report from the wireless device. Consequently, the second node may send a request to the wireless device requesting the combined measurement report. See also "Methods in, or performed by, a second node", Step 1. Sending a measurement request or measurement report configuration to a first node, i.e. wireless device, indicative of the adaptive resolution factor r to be used for the measurement report.

The measurement report request may comprise an adaptive resolution factor to be used for the measurement report.

Also as described above, there are various ways for the wireless device to obtain the adaptive resolution factor. One example is receiving it together with the request for a measurement report. Consequently, the second node may include the adaptive resolution factor in the measurement report request to the wireless device, wherein the second node is enabled to determine with what accuracy the wireless device should create the measurement report. Depending on which operational task the second node wants to perform using the combined measurement result, it may need a certain accuracy in order to properly perform that operational task. In this manner, the second node is enabled to request a combined measurement report that is suited for use when performing the operational task.

The measurement report request may comprise an indication of how the adaptive resolution factor is determined.

There are different ways to determine the adaptive resolution factor. Two examples are that the adaptive resolution factor is pre-defined value or a variable which may be obtained autonomously by the wireless device.

As described above, the resolution factor may be a factor of 0.5, i.e. one or more or 0.5, 1.0. 1.5, 2.0, 2.5. 3.0, 3.5, 4.0 etc.; and/or the resolution factor may be selected among a factor of 0.5 and 1.0, if the measurement result is below a threshold.

Embodiments herein relate to a method performed by a third node in a wireless communication network for obtaining a measurement result from a first node, i.e. a wireless device, is provided. Embodiments of such a method will now be described with reference to FIG. 8. The third node may e.g. be a radio network node, in turn being e.g. a radio base station, eNodeB, a positioning node or a measuring node.

Figure 8:
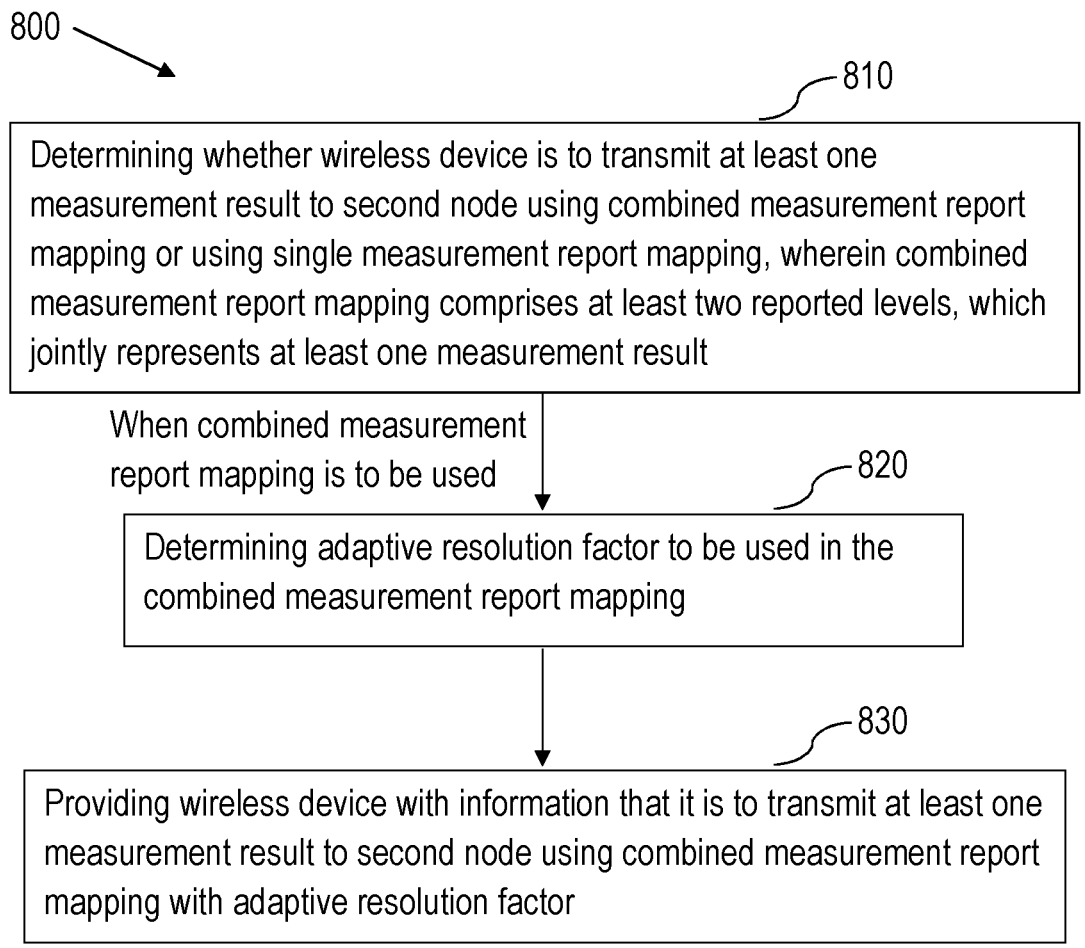
FIG. 8 is a flowchart of a method performed by a third node for obtaining a measurement result from a wireless device, according to an exemplifying embodiment.

FIG. 8 illustrates the method 800 comprising determining 810 whether the wireless device is to transmit at least one measurement result to a second node using a combined measurement report mapping or using a single measurement report mapping, wherein the combined measurement report mapping comprises at least two reported levels, which jointly represents the at least one measurement result. The method 800 further comprises when the combined measurement report mapping is to be used, determining 820 an adaptive resolution factor to be used in the combined measurement report mapping; and providing 830 the wireless device with the information that it is to transmit the at least one measurement result to a second node using the combined measurement report mapping with the adaptive resolution factor.

There may be several ways for the third node to determine whether the wireless device is to transmit at least one measurement result to a second node using a combined measurement report mapping or using a single measurement report mapping, wherein the combined measurement report mapping comprises at least two reported levels, which jointly represents the at least one measurement result. The different ways may be the same or similar to those described for the wireless device in "Step 3: Determining which report type to transmit" described above. In "Step 3: Determining which report type to transmit", it is described now the first node, i.e. the wireless device, determines whether to transmit the obtained (in Step 2) measurement result using a combined measurement report mapping or using a single measurement report mapping. The third node may determine whether the wireless device is to transmit at least one measurement result to a second node using a combined measurement report mapping or using a single measurement report mapping in the same manner.

Once the third node has determined that the combined measurement report mapping is to be used, the third node may determine the adaptive resolution factor to be used in the combined measurement report mapping. The third node may determine the adaptive resolution factor as described above in "Methods of determining the adaptive resolution factor r". The third node may determine one or plurality of values of r for the same type of measurement quantity (e.g. RSTD). For example the value of r may be used by the first and the second nodes for reference measurement quantities, which have the same resolution e.g. r=0.1 Ts for the reference measurement quantity (e g. RSTD) with 1 Ts of resolution, r=1 Ts for the reference measurement quantity (e.g. RSTD) with 5 Ts of resolution and so on.

The third node then provides the wireless device with the information that it is to transmit the at least one measurement result to a second node using the combined measurement report mapping with the adaptive resolution factor. In this manner, the wireless device is enabled to perform its method 600 as described above in conjunction with FIGS. 6a-6c. One example of the third node providing the wireless device with the information is that the thirds node sends or transmits the information to the wireless device. Another example is configuring the wireless device with the information to enable the wireless device to transmit measurement results using the combined measurement report mapping with the determined adaptive resolution factor. For example, the configuring may comprise sending an indication to trigger a certain configuration or sending a configuration message to the wireless device (the configuration message may be received by the first node, i.e. the wireless device in Step 1 as described in "Methods in, or performed by, a first node").

The information provided to the wireless device may further comprise the determined adaptive resolution factor.

Also as described above, the third node may provide the wireless device with the determined adaptive resolution factor the wireless device shall use when creating the combined measurement report.

The second node and the third node may be the same.

In one example, the second and the third node are one and the same. However, in another example, they may be two different nodes.

As above; the resolution factor may be a factor of 0.5, i.e. one or more or 0.5, 1.0, 1.5, 2.0, 2.5, 3.0, 3.5, 4.0 etc.; and/or the resolution factor may be selected among a factor of 0.5 and 1.0, if the measurement result is below a threshold.

Embodiments herein also relate to a first node, i.e. a wireless device, for providing a measurement result to a second node. The wireless device has the same technical features, objects and advantages as the method performed by the wireless device. The wireless device will thus be described only in brief in order to avoid unnecessary repetition. The wireless device is operable in a wireless communication network.

Embodiments of the wireless device 900, 1000 will now be briefly described with reference to FIGS. 9-10.

Figure 9:
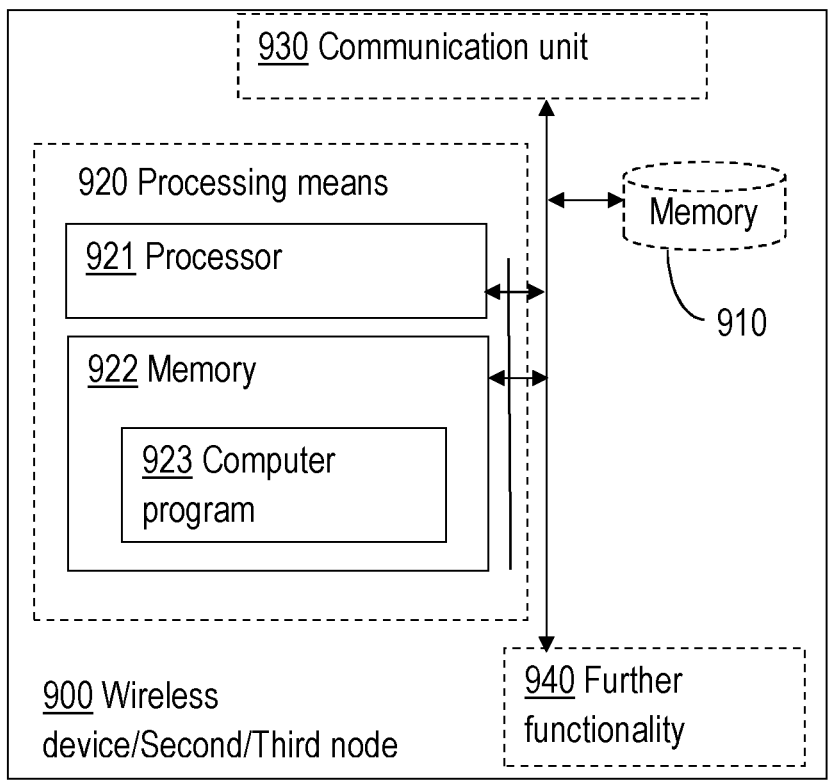
FIG. 9 is a block diagram of a first/second/third node adapted to perform the methods as described herein according to an exemplifying embodiment.
Figure 10:
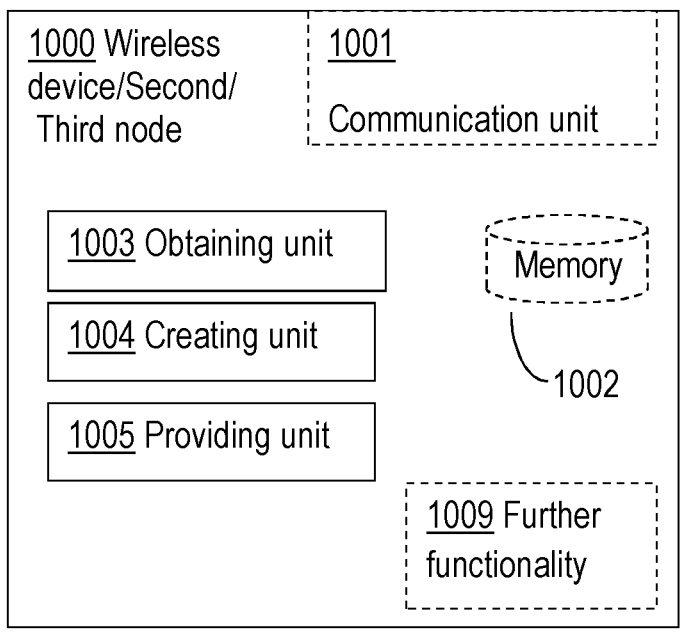
FIG. 10 is a block diagram of a first/second/third node adapted to perform the methods as described herein according to another exemplifying embodiment.

FIGS. 9-10 illustrate the wireless device 900, 1000 being configured for obtaining an adaptive resolution factor; and providing a combined measurement report based on the obtained adaptive resolution factor and a measurement result, wherein a combined measurement report comprises at least two reported levels, which jointly represents the measurement result, to the second node.

According to an embodiment, the wireless device 900, 1000 is further configured for obtaining the measurement result.

According to yet an embodiment, the adaptive resolution factor is obtained from a third node of the wireless communication network.

According to still an embodiment, the adaptive resolution factor is obtained based on pre-defined information.

According to a further embodiment, wherein the adaptive resolution factor is selected based on the measurement result.

According to another embodiment, the combined measurement report provided to the second node comprises an indication of the obtained adaptive resolution factor.

According to yet an embodiment, the wireless device 900, 1000 is further configured for receiving a measurement report request from a third node of the wireless communication network.

According to still an embodiment, the measurement report request comprises the combined measurement report mapping and/or the adaptive resolution factor.

According to a further embodiment, the wireless device 900, 1000 is configured for obtaining the measurement results by (a) performing a radio measurement on a received signal or receiving the measurement result from another node; or (b) receiving the measurement result from another node.

According to another embodiment, the resolution factor is a factor of 0.5, i.e. one or more or 0.5, 1,0, 1.5, 2.0, 2.5, 3.0, 3.5, 4.0 etc.

According to yet another embodiment, the resolution factor is selected among a factor of 0.5 and 1.0, if the measurement result is below a threshold.

Embodiments herein also relate to a second node for obtaining a measurement result from a first node, i.e. a wireless device. The second node has the same technical features, objects and advantages as the method performed by the second node. The second node will thus be described only in brief in order to avoid unnecessary repetition The second node may e.g. be a radio network node, in turn being e.g. a radio base station, eNodeB, a positioning node or a measuring node. The second node is operable in a wireless communication network.

Embodiments of the second node 900, 1000 will now be briefly described with reference to FIGS. 9-10.

FIGS. 9-10 illustrate the second node 900, 1000 being configured for receiving a combined measurement from the wireless device, wherein the combined measurement report comprises at least two reported levels, which jointly represents a measurement result and is based on an adaptive resolution factor; and using the received combined measurement report to perform one or more operational tasks.

According to an embodiment, the second node is further configured for sending a measurement report request to the wireless device.

According to yet an embodiment, the measurement report request comprises an adaptive resolution factor to be used for the measurement report.

According to still an embodiment, the measurement report request comprises an indication of how the measurement result is to be reported.

According to another embodiment, the measurement report request comprises an indication of how the adaptive resolution factor is determined.

According to yet another embodiment, the resolution factor is a factor of 0.5, i.e. one or more or 0.5, 1.0, 1.5, 2.0, 2.5, 3.0, 3.5, 4.0 etc.

According to yet a further embodiment, the resolution factor is selected among a factor of 0.5 and 1.0, if the measurement result is below a threshold.

Embodiments herein also relate to a third node for obtaining a measurement result from a first node, i.e. a wireless device The third node has the same technical features, objects and advantages as the method performed by the third node. The third node will thus be described only in brief in order to avoid unnecessary repetition. The third node may e.g. be a radio network node, in turn being e.g. a radio base station, eNodeB, a positioning node or a measuring node. The third node is operable in a wireless communication network.

Embodiments of the third node 900, 1000 will now be briefly described with reference to FIGS. 9-10.

FIGS. 9-10 illustrate the third node 900, 1000 being configured for determining whether the wireless device is to transmit at least one measurement result to a second node using a combined measurement report mapping or using a single measurement report mapping, wherein the combined measurement report mapping comprises at least two reported levels, which jointly represents the at least one measurement result; when the combined measurement report mapping is to be used, determining an adaptive resolution factor to be used in the combined measurement report mapping; and providing the wireless device with the information that it is to transmit the at least one measurement result to a second node using the combined measurement report mapping with the adaptive resolution factor.

According to an embodiment, the information provided to the wireless device may further comprise the determined adaptive resolution factor.

According to yet an embodiment, the second node and the third node are the same.

According to still an embodiment, the resolution factor is a factor of 0.5, i.e. one or more or 0.5, 1.0, 1.5, 2.0, 2.5, 3.0, 3.5, 4.0 etc.

According to another embodiment, the resolution factor is selected among a factor of 0.5 and 1.0, if the measurement result is below a threshold.

FIG. 9 is a block diagram of a wireless device/second node/third node adapted to perform the methods as described herein. FIG. 9 illustrates the wireless device/second node/third node 900 comprising a processor 921 and memory 922, the memory comprising instructions, e.g. by means of a computer program 923, which when executed by the processor 921 causes the wireless device/second node/third node 900 e.g. to perform the respective methods described above in conjunction with FIGS. 6a-6c, 7a, 7b and 8. It shall be pointed out that the memory may comprise instructions, e.g. by means of a computer program 923, which when executed by the processor 921 causes the first/second/third node 900 to perform any action(s) of any embodiment or combinations of embodiments described herein.

FIG. 9 also illustrates the wireless device/second node/third node 900 comprising a memory 910. It shall be pointed out that FIG. 9 is merely an exemplifying illustration and memory 910 may be optional, be a part of the memory 922 or be a further memory of the first/second/third node 900. The memory may for example comprise information relating to the wireless device/second node/third node 900, to statistics of operation of the wireless device/second node/third node 900, just to give a couple of illustrating examples. FIG. 9 further illustrates the wireless device/second node/third node 900 comprising processing means 920, which comprises the memory 922 and the processor 921. Still further, FIG. 9 illustrates the wireless device/second node/third node 900 comprising a communication unit 930. The communication unit 930 may comprise an interface through which the wireless device/second node/third node 900 communicates with other nodes or entities of the wireless communication network as well as other communication units. FIG. 9 also illustrates the wireless device/second node/third node 900 comprising further functionality 940. The further functionality 940 may comprise hardware of software necessary for the wireless device/second node/third node 900 to perform different tasks that are not disclosed herein.

An alternative exemplifying realisation, or implementation, of the wireless device/second node/third node is illustrated in FIG. 10. FIG. 10 illustrates the wireless device/second node/third node 1000 comprising an obtaining unit 703 for obtaining a measurement result; a creating unit for creating a combined measurement report; and a providing unit for providing the created combined measurement report to the second node. It shall be pointed out that FIG. 10 illustrates an exemplifying embodiment and different units may be comprised in the wireless device/second node/third node in order to perform any action(s) of any embodiment or combinations of embodiments described herein. The units illustrated in FIG. 10 are merely examples and different units may be comprised in the different nodes, e.g. the wireless device may have an obtaining unit and a providing unit; the second node may have a receiving unit and a using unit; and the third node may have a determining unit and a providing unit.

In FIG. 10, the wireless device/second node/third node 1000 is also illustrated comprising a communication unit 1001. Through this unit, the wireless device/second node/third node 1000 is adapted to communicate with other nodes and/or entities in a network in which they are operating or connected to. The communication unit 1001 may comprise more than one receiving arrangement. For example, the communication unit 1001 may be connected to both a wire and an antenna, by means of which the wireless device/second node/third node 1000 is enabled to communicate with other nodes and/or entities in the wireless communication network in which they operate or to which they are connected. Similarly, the communication unit 1001 may comprise more than one transmitting arrangement, which in turn is connected to both a wire and an antenna, by means of which the wireless device/second node/third node 1000 is enabled to communicate with other nodes and/or entities in the wireless communication network. The wireless device/second node/third node 1000 further comprises a memory 1002 for storing data. Further, the wireless device/second node/third node 1000 may comprise a control or processing unit (not shown) which in turn is connected to the units 1003-1005. It shall be pointed out that this is merely an illustrative example and the wireless device/second node/third node 1000 may comprise more, less or other units or modules which execute the functions of the wireless device/second node/third node 1000 in the same manner as the units illustrated in FIG. 10.

It should be noted that FIG. 10 merely illustrates various functional units in the wireless device/second node/third node 1000 in a logical sense. The functions in practice may be implemented using any suitable software and hardware means/circuits etc. Thus, the embodiments are generally not limited to the shown structures of the wireless device/second node/third node 1000 and the functional units. Hence, the previously described exemplary embodiments may be realised in many ways. For example, one embodiment includes a computer-readable medium having instructions stored thereon that are executable by the control or processing unit for executing the method steps in the wireless device/second node/third node 1000. The instructions executable by the computing system and stored on the computer-readable medium perform the method steps of the wireless device/second node/third node 1000 as described above.

The network node has the same possible advantages as the method performed by the wireless device/second node/third node.

Figure 11:
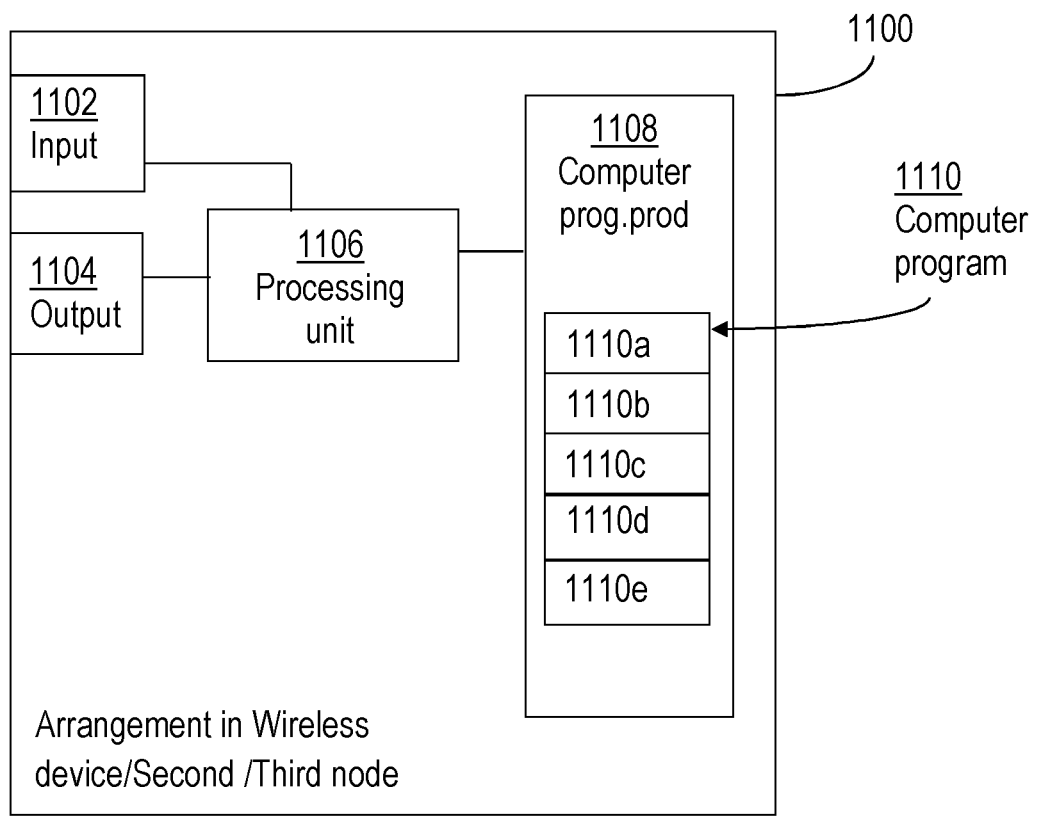
FIG. 11 is a block diagram of an arrangement in a first/second/third node adapted to perform the methods as described herein according to an exemplifying embodiment.

FIG. 11 schematically shows an embodiment of an arrangement 1100 in a first and/or the second node 1000. Comprised in the arrangement 1100 in the first and/or the second node 1000 are here a processing unit 1106, e.g. with a Digital Signal Processor, DSP. The processing unit 1106 may be a single unit or a plurality of units to perform different actions of procedures described herein. The arrangement 800 of the wireless device/second node/third node 1000 may also comprise an input unit 1102 for receiving signals from other entities, and an output unit 1104 for providing signal(s) to other entitles. The input unit and the output unit may be arranged as an integrated entity or as illustrated in the example of FIG. 10, as one or more interfaces 1001.

Furthermore, the arrangement in the wireless device/second node/third node 1000 comprises at least one computer program product 808 in the form of a non-volatile memory, e.g. an Electrically Erasable Programmable Read-Only Memory, EEPROM, a flash memory and a hard drive. The computer program product 1108 comprises a computer program 1110, which comprises code means, which when executed in the processing unit 1106 in the arrangement 1100 in the wireless device/second node/third node 1000 causes the wireless device/second node/third node 1000 to perform the actions e.g. of the procedure described earlier in the description above and FIGS. 6a-6c, 7a, 7b and 8.

The computer program 1110 may be configured as a computer program code structured in computer program modules 1110a-1110e. Hence, in an exemplifying embodiment, the code means in the computer program of the wireless device/second node/third node 1000 comprises a transmitting unit, or module, a receiving unit, or module, and a reporting unit, or module, for performing the methods of the wireless device/second node/third node 1000 as described above.

The computer program modules could essentially perform the actions described above, to emulate the wireless device/second node/third node 1000. In other words, when the different computer program modules are executed in the processing unit 1106, they may correspond to the units 1003-1005 of FIG. 10.

Although the code means in the respective embodiments disclosed above in conjunction with FIG. 10 may be implemented as computer program modules which when executed in the respective processing unit causes the wireless device/second node/third node respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors, instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the wireless device/second node/third node respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Figure 12:
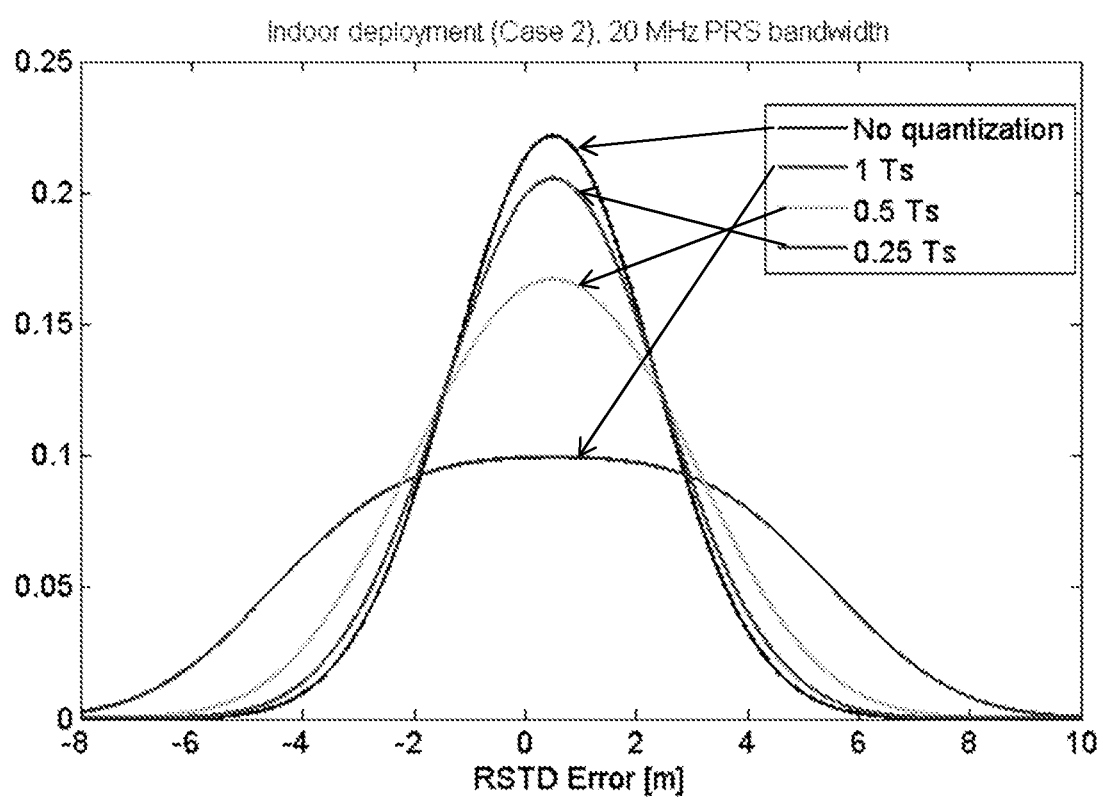
FIG. 12 is a graph illustrating the impact of RSTD measurement report resolution on the RSTD error distribution.
Figure 13:
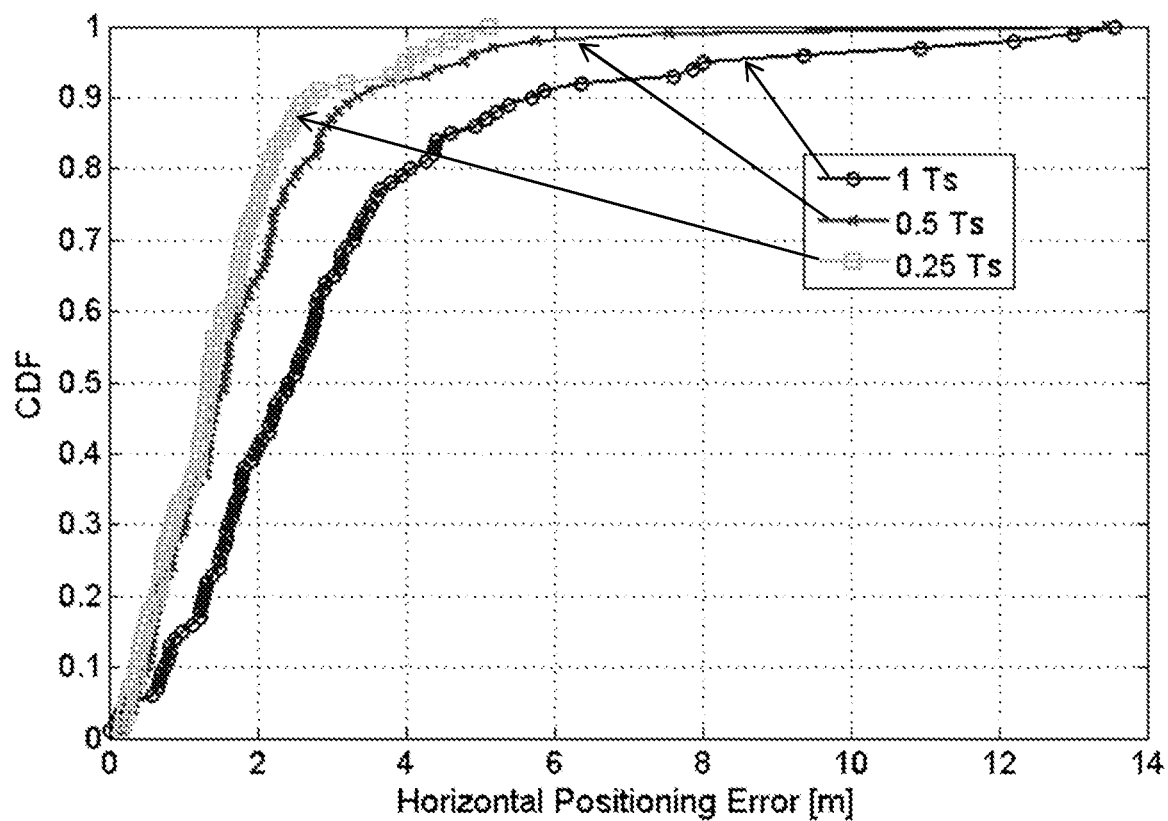
FIG. 13 is a graph illustrating horizontal positioning error comparison for different RSTD quantisation error.

Higher-resolution RSTD measurement reporting is beneficial, e.g., in scenarios with good LOS conditions and indoor scenarios Here, simulation results for the indoor deployment scenario (Case 2) in TR 37.857 [3] and the PRS bandwidth of 20 MHz are presented, see FIGS. 12 and 13.

The effect of higher-resolution RSTD measurement reporting is investigated by performing oversampling at the UEs; the used sampling frequency in this contribution is 4/Ts (122.88 MHz). RSTD measurement report resolution of 1 Ts, 0.5 Ts, and 0.25 Ts are studies. In FIG. 1, we show how the quantisation error impacts the RSTD error for 1 Ts, 0.5 Ts, and 0.25 Ts compared to the no quantisation case (i.e., no additional errors due to measurement report mapping) while normalizing the simulated data. The 1 Ts resolution causes widening of the error distribution that is suppressed much by 0.5 Ts, and then even more by 0.25 Ts.

In the indoor deployment scenario, the NLOS issues are mainly originated from the macro cells, therefore in our positioning estimation, only the RSTD measurements of the small cells are considered. The considered RSTD measurement report granularity is 1 Ts, 0.5 Ts, and 0.25 Ts. FIG. 13 shows the horizontal positioning error for each of the three resolutions. Table 6 in FIG. 14 presents the percentile values of the CDF curves in FIG. 12. The results show that the errors can be significantly reduced while using higher-resolution RSTD measurement report mapping.

Observation 1: Based on the simulation results, higher-resolution RSTD measurement reporting is beneficial.

Observation 2: RSTD reporting granularity of 0.5 Ts improves the accuracy for almost all indoor UEs compared to the current standard 1 Ts.

Observation 3: The overall improvement with 0.25 Ts is marginal, but the improvement is significant for the worst-case performance (60% reduction in positioning error) compared to both 0.5 Ts and 1 Ts.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a wireless device in a wireless communication network for providing a measurement result to a second node, the method comprising:

obtaining an adaptive resolution factor, wherein the adaptive resolution factor is used to determine a reporting range of a measured reference signal time difference (RSTD) result and is selected based on the measured RSTD result; and providing a combined measurement report based on the obtained adaptive resolution factor and the measured RSTD result, wherein the combined measurement report comprises at least two reported levels, which jointly represents the reporting range of the measured RSTD result, to the second node.

2. The method according to claim 1, further comprising obtaining a measurement result.

3. The method according to claim 2, wherein the obtaining of the measurement results comprises (a) performing a radio measurement on a received signal or receiving the measurement result from another node; or (b) receiving the measurement result from another node.

4. The method according to claim 1, wherein the resolution factor is selected among a factor of 0.5 and 1.0, if the measurement result is below a threshold.

5. A wireless device for providing a measurement result to a second node, the wireless device comprising:

at least one processing circuitry; and at least one storage that stores processor-executable instructions, when executed by the processing circuitry, causes a user equipment to:

obtain an adaptive resolution factor; wherein the adaptive resolution factor is used to determine a reporting range of a measured reference signal time difference (RSTD) result and is selected based on the measured RSTD result; and provide a combined measurement report based on the obtained adaptive resolution factor and the measured RSTD result, wherein the combined measurement report comprises at least two reported levels, which jointly represents the reporting range of the measured RSTD result, to the second node.

6. The wireless device according to claim 5, wherein the instructions further cause the wireless device to obtain a measurement result.

7. The wireless device according to claim 6, wherein the wireless device is configured to obtain the measurement results by (a) performing a radio measurement on a received signal or receiving the measurement result from another node; or (b) receiving the measurement result from another node.

8. The wireless device according to claim 5, wherein the resolution factor is selected among a factor of 0.5 and 1.0, if the measurement result is below a threshold.

9. A Computer program product stored in a non-transitory computer readable medium, which when run in a processor causes a wireless device to perform a method for providing a measurement result to a second node, the method comprising:

obtaining an adaptive resolution factor, wherein the adaptive resolution factor is used to determine a reporting range of a measured reference signal time difference (RSTD) result and is selected based on the measured RSTD result; and providing a combined measurement report based on the obtained adaptive resolution factor and the measured RSTD result, wherein the combined measurement report comprises at least two reported levels, which jointly represents the reporting range of the measured RSTD result, to the second node.

\* \* \* \* \*